US010450008B2

(12) United States Patent
Jacob et al.

(10) Patent No.: US 10,450,008 B2
(45) Date of Patent: Oct. 22, 2019

(54) VEHICLE, IN PARTICULAR MOTOR VEHICLE, WITH A TAILGATE

(71) Applicant: Gebrüder Jacob GbR, Wunstorf (DE)

(72) Inventors: Dirk Jacob, Garbsen (DE); Jochen Jacob, Bad Nenndorf (DE); Rüdiger Jacob, Bad Münder (DE)

(73) Assignee: Gebrüder Jacob GbR, Wunstorf (DE)

( * ) Notice: Subject to any disclaimer, the term of this patent is extended or adjusted under 35 U.S.C. 154(b) by 0 days.

(21) Appl. No.: 15/545,630

(22) PCT Filed: Jan. 22, 2016

(86) PCT No.: PCT/EP2016/051377
§ 371 (c)(1),
(2) Date: Jul. 21, 2017

(87) PCT Pub. No.: WO2016/116621
PCT Pub. Date: Jul. 28, 2016

(65) Prior Publication Data
US 2018/0015964 A1 Jan. 18, 2018

(30) Foreign Application Priority Data

Jan. 22, 2015 (DE) .................. 10 2015 100 957
Jan. 22, 2015 (DE) .................. 10 2015 100 959
(Continued)

(51) Int. Cl.
*B62D 33/02* (2006.01)
*B62D 33/027* (2006.01)
*B62D 33/033* (2006.01)
*B62D 33/037* (2006.01)
(Continued)

(52) U.S. Cl.
CPC .......... *B62D 33/0273* (2013.01); *B60J 5/108* (2013.01); *B60J 5/125* (2013.01); *B62D 33/033* (2013.01); *B62D 33/037* (2013.01)

(58) Field of Classification Search
CPC .. B62D 33/0273; B62D 33/03; B62D 33/023; B62D 25/12; B62D 35/007; B62D 33/02;
(Continued)

(56) References Cited

U.S. PATENT DOCUMENTS 5,352,008 A 10/1994 Denvir
6,357,813 B1 3/2002 Bandeberghe et al.
(Continued)

FOREIGN PATENT DOCUMENTS

DE 10 2005 005 769 A1 10/2006
DE 20 2007 018 286 U1 6/2008
EP 1 757 516 A1 2/2007

OTHER PUBLICATIONS

International Search Report in PCT/EP2016/051377, report dated Apr. 12, 2016 (6 pages).
(Continued)

*Primary Examiner* — D Glenn Dayoan
*Assistant Examiner* — Sunsurraye Westbrook
(74) *Attorney, Agent, or Firm* — Shlesinger, Arkwright & Garvey LLP

(57) ABSTRACT

Vehicle, in particular a motor vehicle, which is equipped with a tailgate which can be pivoted on the rear of the vehicle. The tailgate can be pivoted by way of a pivoting device, around a pivoting axis between a closed position, in which a loading surface of the rear of the vehicle is defined, and an open position in which the loading surface of the rear side is open. In order to pivot the tailgate, the pivoting apparatus includes at least one pivoting arm on which the tailgate can be moved in a translatory manner and can be detachably held in place.

16 Claims, 15 Drawing Sheets

(30) Foreign Application Priority Data

Figure 1:
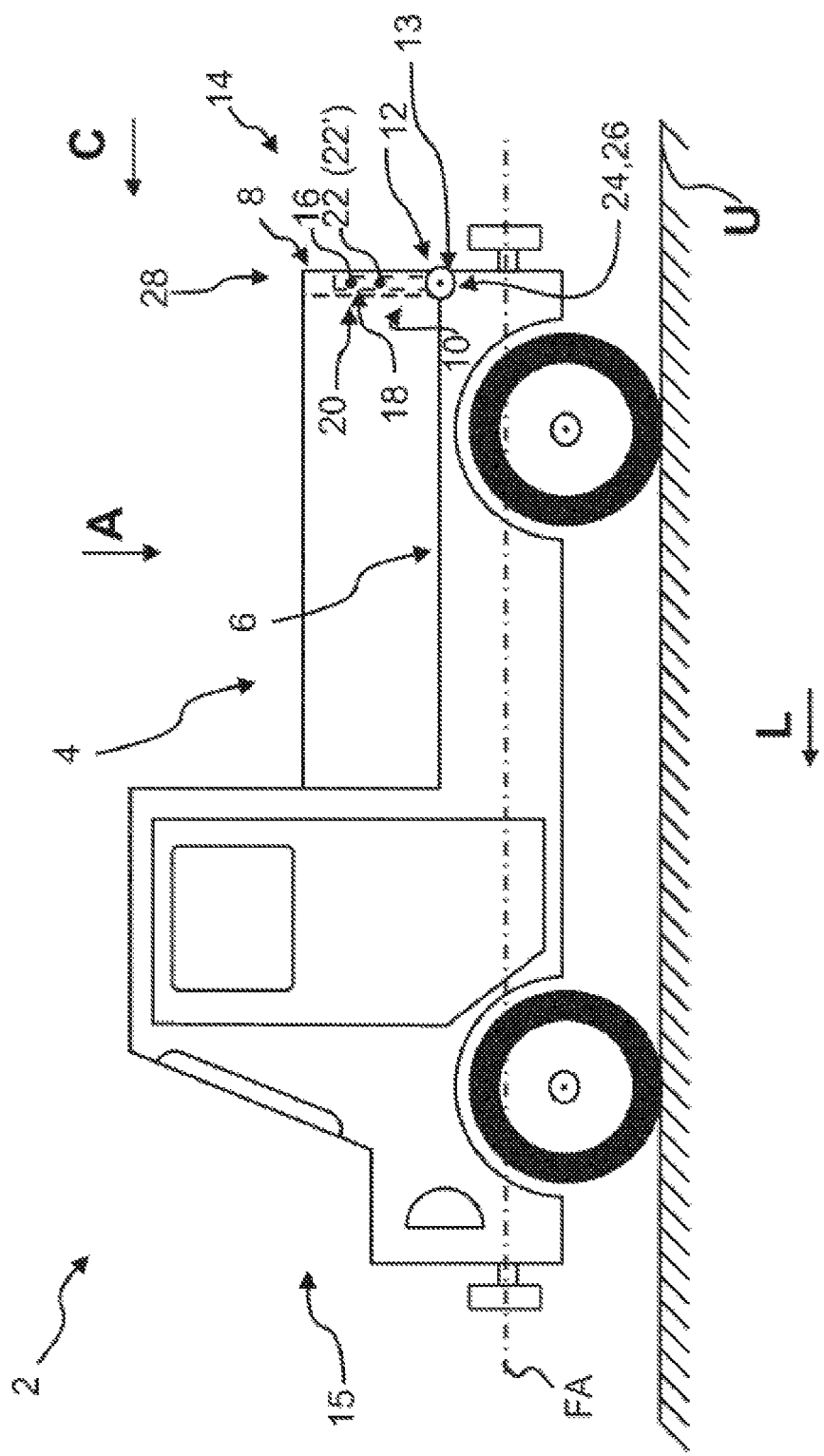

| Feb. 20, 2015 | (DE) | ........................ | 10 2015 102 418 |
| Feb. 20, 2015 | (DE) | .................... | 20 2015 100 816 U |
| May 11, 2015 | (DE) | ........................ | 10 2015 107 349 |

(51) Int. Cl.
  *B60J 5/10* (2006.01)
  *B60J 5/12* (2006.01)

(58) Field of Classification Search
  CPC ...... B62D 33/027; B62D 33/037; B60J 5/103;
       B60J 5/108; B60J 1/1846; B60J 1/1884;
       B60J 5/101; B60J 5/104; B60J 5/107;
       B60J 7/085
  USPC ..... 296/57.1, 50, 51, 146.4, 183.1, 37.6, 64,
       296/146.1, 146.8, 146.9; 49/386, 208,
       49/383; 410/129, 135
  See application file for complete search history.

(56) References Cited

U.S. PATENT DOCUMENTS

| 6,698,810 | B1 | 3/2004 | Lane | |
| 6,905,158 | B1 | 6/2005 | Bastian | |
| 6,957,840 | B1 | 10/2005 | Endres | |
| 7,232,173 | B2* | 6/2007 | Katterloher | ............... B60R 3/02 296/50 |
| 2002/0121794 | A1 | 9/2002 | Vejnar | |
| 2004/0227368 | A1 | 11/2004 | Seksaria | |
| 2008/0191507 | A1 | 8/2008 | Farber | |
| 2008/0197650 | A1* | 8/2008 | Stratten | ............... B62D 33/0273 296/50 |
| 2008/0211254 | A1* | 9/2008 | Maier | ................... B60P 1/4414 296/57.1 |
| 2009/0021039 | A1* | 1/2009 | Quigley | ................... B60J 5/103 296/57.1 |
| 2012/0126564 | A1* | 5/2012 | Hausler | ............. B62D 33/0273 296/62 |
| 2015/0239372 | A1* | 8/2015 | Bauer | ................... B62D 33/03 296/57.1 |

OTHER PUBLICATIONS

Written Opinion of the ISA in PCT/EP2016/051377, opinion dated Apr. 25, 2016 (12 pages).

* cited by examiner

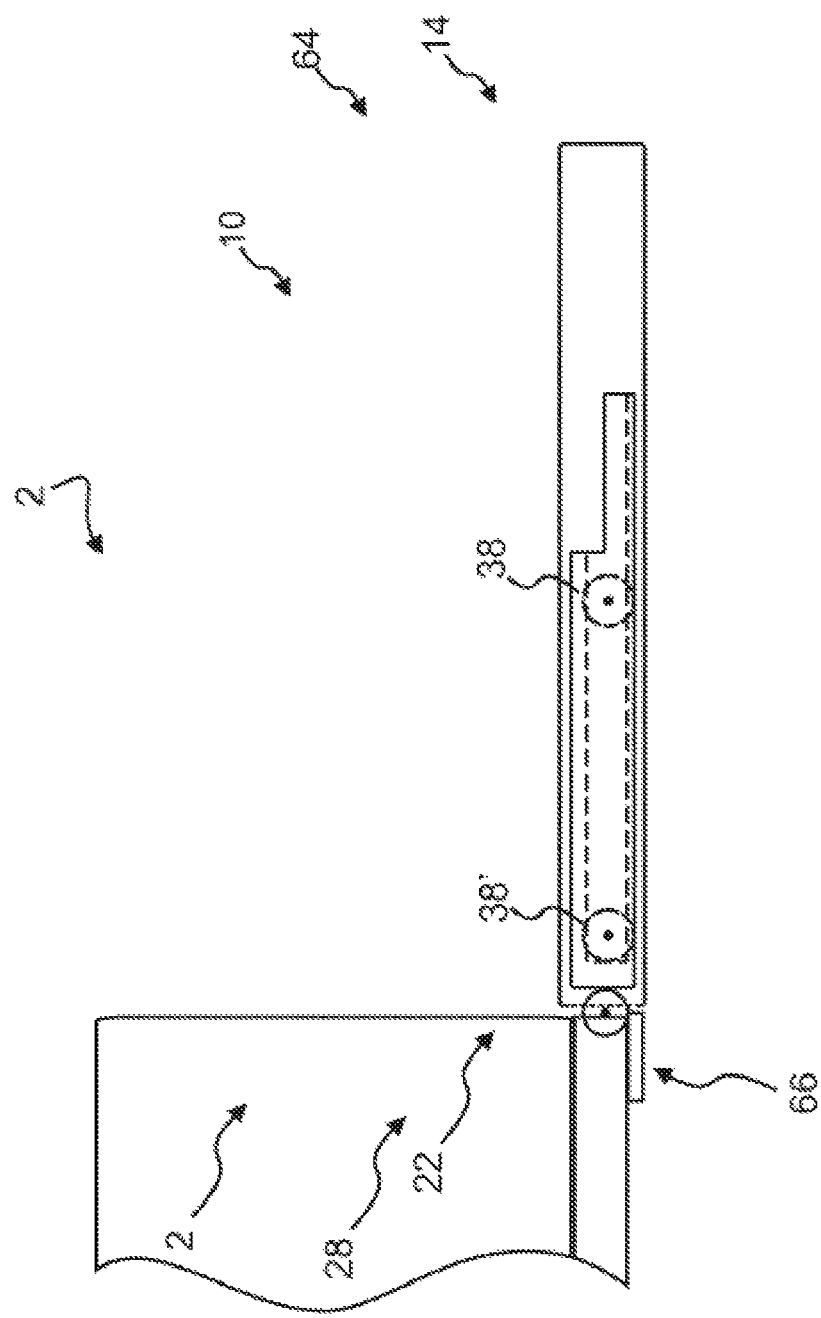

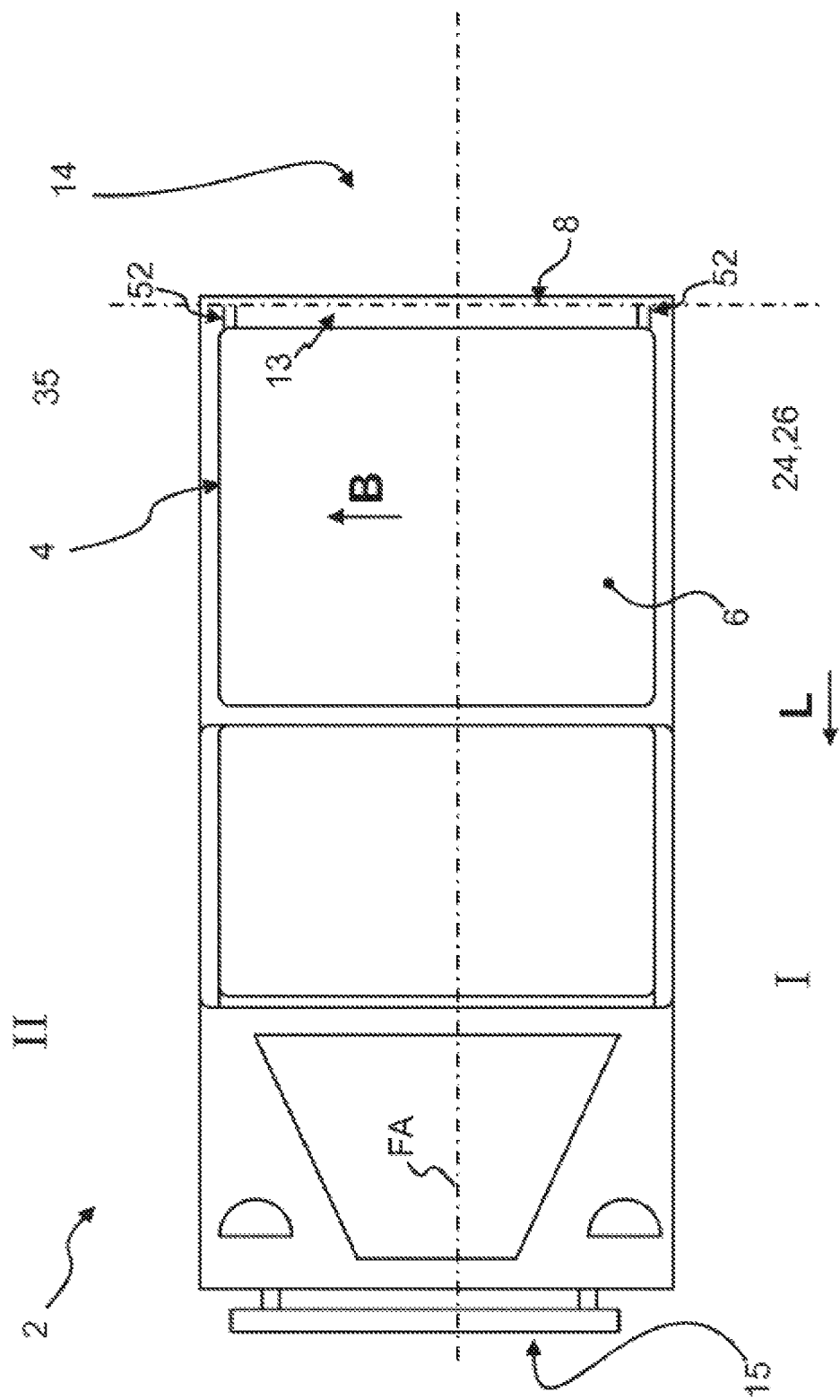

VEHICLE, IN PARTICULAR MOTOR VEHICLE, WITH A TAILGATE

The invention relates to a vehicle, in particular a motor vehicle, according to the preamble of claim 1, which comprises a tailgate, which is limited on the rear side by holding means around a pivoting axis between a closed position, in which it limits a loading surface of the motor vehicle, and an open position, in which it opens the loading surface on the rear side, and is arranged in a pivotable manner on the rear of the vehicle.

These types of vehicles with tailgates are generally known from the prior art. They are used particular in vehicles with an open loading surface, such as can be present, for example and in particular, in transporters, delivery vehicles as well as commercial vehicles and in particular so-called pickups, to make the loading surface on the rear side accessible, for example for loading and unloading activities. The aforementioned loading surface is known by the term of flat bed, among others.

Vehicles of the type in question can also be equipped with a loading surface that is covered or covered in sections, which loading surface is made accessible via the tailgate as previously described.

In addition, vehicles of the type in question comprise vehicles with as well as without their own means of propulsion, which in the latter case can be a vehicle trailer, for example.

Vehicles of the type in question are known for example from U.S. Pat. No. 5,711,569 A, in which the tailgate is arranged in a pivotable manner as well as detachably on the rear of the vehicle. In this case, the hinges for pivoting the tailgate are provided in particular so that the tailgate can be lifted out of the hinges. To facilitate handling, the proposed prior art tailgate provides for a handle area to make it easier for one person to handle or transport the tailgate.

In addition, vehicles of the type in question are known from U.S. Pat. No. 8,246,098 B2, in which a further, smaller gate is accommodated in the tailgate itself that can be pivoted relative to the tailgate. When the smaller gate is being purposefully attached on the rear of the vehicle, it can be pivoted around an axis relative to the tailgate, which axis is arranged transverse to the pivoting axis in order to pivot the tailgate to the vehicle. The smaller gate is used to free a partial region of the tailgate in an opening state in order to be able to better reach the loading surface without having to open the tailgate as such.

In addition, a vehicle in a design of a vehicle trailer is known from EP 1 757 516 A1, which comprises a tailgate arranged pivotably on the rear of the vehicle, which tailgate is arranged in turn on the vehicle in a detachable manner. Hinges or mountings for the tailgate are thereby proposed, which are designed correspondingly in an open manner.

In addition, vehicles of the type in question are known from U.S. Pat. No. 6,279,979 B1, DE 361278 C3, U.S. Pat. Nos. 6,679,464 B1, 7,549,691 B2, 8,740,279 B1, 4,028,350 A, 6,857,678 B2, US 556152A, U.S. Pat. No. 5,133,584 A, DE 102005005769 A1 as well as US 2003/001 5885 A1.

In addition, vehicles with a vehicle rear or tailgate are known in the extensive field of the invention, which are designed in various ways with respect to the vehicle's usability. Thus, a vehicle designed as a so-called pickup is known for example from U.S. Pat. No. 5,133,584 A, in which the tailgate is configured from plate elements, which are arranged in such a way with respect to each other and attached to the vehicle so that a ramp can be formed for loading the rear of the vehicle. In this case, corresponding guide means is provided which ensure a correspondingly required movability of the tailgate components.

Moreover, a vehicle is known from U.S. Pat. No. 5,352,008 A, which features a tailgate, which is configured primarily with respect to a lower air resistance and can be moved on the rear of the vehicle.

Moreover, a vehicle is known from U.S. Pat. No. 3,004,790 A, in which the loading surface can be extended, wherein the tailgate attached to the loading surface also moves during an extension motion.

Overall, different solutions of attaching a tailgate to a vehicle, in particular to motor vehicles, are known from the prior art. The structure and function of such a tailgate are generally known. As a component of a side wall of a vehicle, tailgates are used to open or close, among other things, the opening provided in the vehicle body on the rear side to limit the loading area in a closed state of the tailgate on the rear side. Thus, tailgates having single as well as multi-piece segments, among others, are known from DE 202007018286 U1.

However, the disadvantage of the type of vehicles in question known from the prior art is that loading and unloading activities are hampered. Among other things, this is because a tailgate situated in an open position, which, in this position, opens the loading surface for loading and unloading possibilities and thus makes the rear side accessible, creates a mandatory distance from the loading surface because of the dimensions thereof.

Consequently, it is problematic, among other things, for a person or a forklift truck, such as a forklift, for example to load or unload the loading surface on the rear side, because the mandatory distance from the loading surface caused by the tailgate situated in the open position restricts a rear-side approach of the forklift to the loading surface.

Against this background, the object of the invention is to disclose a vehicle, the loading surface of which is better accessible for loading and unloading activities and whose ergonomics are improved over known vehicles.

In achieving the stated object thereof, the invention breaks free of idea of extensively redesigning the structure of the loading surface or the tailgate as well as the side walls of the vehicle.

In addition, the invention moves away from the approach of needing to considerably change the structure or the design of a tailgate.

The invention is based rather on the fundamental idea of seeking an improvement in the usability of the loading surface in the attachment of the tailgate on the rear of the vehicle.

Said fundamental idea is thereby based on a loading and unloading of the loading surface on the rear side that occurs in that the cargo objects in question are guided to the loading surface on the rear side.

The invention achieves the stated object thereof, among other things, by a use of the fundamental ideas described above in a surprising way in that the pivoting apparatus comprises first guide means, which is arranged on the rear of the vehicle, and has second guide means, which is arranged on the tailgate, which cooperate for translatory motion control of the tailgate for the attachment thereof on the rear of the vehicle.

Consequently, first guide means and second guide means are set up and configured so that in cooperation they form the aforementioned translatory motion control for the tailgate.

The translatory motion control is also designated in an abbreviated manner in the following as motion control.

In terms of description, the statements related to attaching a tailgate also apply analogously for a detachment of the tailgate from the rear of the vehicle.

In addition, the statements related to loading or unloading likewise apply analogously to each other as well to processes (such as, e.g., the cleaning, maintenance, etc.), in which the loading surface of the vehicle must be made accessible. Furthermore, the statements likewise apply with respect to the accessibility of a loading surface. Thus, for example, in the case of some vehicles, footplates or a climbing aid are attached on the rear of the vehicle, which are not accessible or usable when the tailgate is opened. But because of the possibility of detaching the tailgate according to the invention, these types of disadvantages are likewise removed, thereby facilitating safe entry to the loading surface of a vehicle according to the invention.

Said cooperation of the first guide means with the second guide means takes place such that the tailgate is movably guided between an initial position, in which the first guide means and the second guide means are arranged in relation to each other for the translatory motion control of the tailgate, and a target position, in which the tailgate is arranged purposefully on the rear of the vehicle.

The invention consequently achieves the stated object thereof in that the tailgate can be removed in a simple manner from the rear of the vehicle or can be attached to the rear of the vehicle, whereby a one-person operation in particular is made possible for attaching or detaching (removing) the tailgate from the rear of the vehicle. In terms of the invention, the first guide means in cooperation with the second means forms a forced guidance to reduce the degree of freedom of movement of a tailgate to the benefit of a simpler handing.

In addition, a translatory motion control provided according to the invention for the attachment or removal of the tailgate to or from the rear of the vehicle via cooperation of the first and second guide means ensures that the tailgate is guided along a specified movement path.

The motion control of the tailgate in the cooperation of the first and second guide means is accomplished in particular by a movement of the tailgate in the direction of the rear of the vehicle towards the front of the vehicle (or in the opposite direction).

In addition, the invention provides that the first guide means comprises at least two pivoting arms arranged on the rear of the vehicle pivotably around the pivoting axis, which are longitudinally extended radial to the pivoting axis and cooperate with the second guide means for the translatory motion control of the tailgate.

Because of the design of a vehicle according to the invention and by means of the cooperation of the first and second guide means, once the tailgate is attached on the rear of the vehicle, it is coupled for movement with the pivoting arms, by means of which it is disposed in a pivotable manner on the rear of the vehicle.

In this respect, the pivoting arms are situated in an open position as soon as the tailgate arranged thereon is in an open position. The sample applies analogously to the closed position. The same applies if the tailgate is not attached to the pivoting arms.

The arrangement of the pivoting arms on the pivoting axis is accomplished against the background of the aforementioned arrangement to the effect that a first free end of the respective pivoting arms is facing the pivoting axis, while the remaining free end is facing away from the pivoting axis, wherein the first and second free end are spaced apart from each other in the radial direction of the pivoting axis corresponding to the geometric dimensions of the respective pivoting arm. Consequently, with the arrangement thereof on the rear of the vehicle, the first free end of the pivoting arm has a smaller distance to the pivoting axis in the radial direction of the pivoting axis as compared to the second free end of the pivoting arm.

The aforementioned free ends of the respective pivoting arm are spaced apart on the pivoting axis in the radial direction of the pivoting axis. The advantage of this is that because of the aforementioned two pivoting arms, which can be supplemented by additional pivoting arms, the motion control of the tailgate for attachment thereof on the rear of the vehicle can be simplified and made more precise.

The second guide means is arranged thereby on the lateral flanks of the tailgate, thereby yielding mounting advantages. Furthermore, the aforementioned pivoting arms can be arranged, at least in sections, in a gap formed between the tailgate and the vehicle sides, such as is included in an advantageous further embodiment of the invention given in the following.

According to the invention, the aforementioned gap is a construction space, which exists between the tailgate and the lateral parts of the rear of the vehicle that are adjacent thereto and which is present in particular in the closed position of the tailgate between the tailgate and the lateral or rear parts of the rear of the vehicle. In this respect, the pivoting arms are preferably arranged in the closed position in an aforementioned gap at least in sections, which gap exists on both sides on the lateral flanks of the tailgate. In this respect, a typical design contingent on free construction space is used according to the invention for the movability of a tailgate.

The gap is thereby frequently covered, at least in sections, by the outer surface of the tailgate, which faces away from the front of the vehicle and is directed outside of the vehicle. The pivoting arm/pivoting arms or the pivoting frame is/are preferably accommodated completely in the shadow gap in the closed position of the tailgate.

The gap prevents the tailgate from getting jammed undesirably in the closed position on the rear of the vehicle and is therefore easy to move.

In particular, the invention offers the advantage that the tailgate can be arranged to begin with on the first guide means by means of the second guide means in order to thereupon be able to be correspondingly aligned or positioned on the rear of the vehicle.

The invention therefore reduces the degrees of freedom which hamper the attachment of a tailgate on the rear of the vehicle, in that a secure motion control of the tailgate is provided by the aforementioned guide means.

This ensures, among other things, that an undesired movement of the tailgate in the direction of the gravity in effect is prevented and/or that the manual handgrips for attaching the tailgate on the vehicle are significantly reduced.

The motion control ensures that, when the tailgate is in an open position, the tailgate can be removed [via] the first guide means in a simple manner as well as be guided correspondingly.

To this end, to simplify attachment, the first guide means is maintained in an open position analogous to that of the tailgate and thereby form in particular a support for the tailgate in order to hold said tailgate on the rear of the vehicle for positioning/alignment thereof for an attachment on the rear of the vehicle and to be able to protect it from dropping down (undesired movement in the direction of the gravity in effect). This applies analogously to a detachment of the tailgate from the rear of the vehicle.

The handling of the tailgate is thereby facilitated advantageously during the attachment to or detachment from the rear of the vehicle in the case of a vehicle according to the invention in that the motion control that is achieved effectively prevents, among other things, an undesired damage to the tailgate e.g., by a collision with the rear of the vehicle.

The invention also advantageously facilitates safe attachment of the tailgate by merely one person on the rear of the vehicle. The invention thereby offers an alignment or positioning aid for attaching/detaching a tailgate to/from the vehicle rear of a vehicle according to the invention, because, first of all, the tailgate obtains a support by means of the first and second guide means in order to thereupon be able to be correspondingly aligned or positioned on the vehicle for attachment thereof.

To better explain the invention, a purposeful arrangement of a tailgate on the vehicle is assumed for identifying reference values and handling processes. Deviations therefrom are yielded from the context or from related explanations of the inventive structure or the inventive arrangement. In addition, the described advantages as well as the processes for attaching a tailgate on the rear of the vehicle also apply analogously to detaching a tailgate from the vehicle rear of a vehicle according to the invention. As a result, descriptions of an attachment also include in an analogous manner a detachment of a tailgate from a rear of the vehicle.

In terms of the invention, a purposeful arrangement of the tailgate on the rear of the vehicle must be understood that, to fulfill its function, said tailgate is arranged on the rear of the vehicle pivotably around the pivoting axis between the closed and open positions.

According to the invention, an open position of the tailgate is characterized, for example and in particular, in that it makes the loading surface of a vehicle according to the invention accessible on the rear side, in particular for cleaning, for loading and unloading activities. To this end, the tailgate is situated, for example and in particular, in a horizontal or almost horizontal alignment or an alignment approximate thereto relative to the vehicle. Basically, such an alignment is favorable for an attachment of the tailgate, because a movement of the tailgate in the direction of the rear of the vehicle towards the front of the vehicle (or in the opposite direction) is adequate for alignment.

According to the invention, the pivoting axis extends along the loading edge of the vehicle. The loading edge of the vehicle thereby produces a limitation of the loading surface on the rear side.

In the case of an unloaded vehicle, the loading edge or the pivoting axis is directed substantially or almost parallel to a wheel axis or in the direction along a wheel axis. In terms of the invention, the wheel axis is the axis, on which one or at least two wheels, with which the vehicle supports itself on the ground for purpose of locomotion, is/are rotatably mounted. This applies analogously to tracked vehicles.

In the case of a purposeful arrangement, the rear of the tailgate is arranged, for example and in particular, in a mounted manner on the rear of the vehicle by means of pivot joints or hinges.

The invention yields the advantage that the loading surface is easier to handle ergonomically in this respect by virtue of the fact that it is accessible in a simpler manner, in particular for a loading and unloading.

In addition, a vehicle designed according to the invention makes it possible for the loading surface of the vehicle to be used more versatilely, in that, for example, a tailgate can be replaced by another one or by the first-mentioned tailgate of a different design, which can be attached by means of the first and second guide means on a vehicle according to the invention.

As a result, it is possible in the case of a vehicle according to the invention to use different tailgates, which can be designed differently. Therefore, the invention taps into another advantage in that correspondingly designed tailgates can be used for different uses of a vehicle according to the invention. The tailgate can also be replaced thereby by a net or retaining straps.

The translatory motion control brought about according to the invention by the cooperation of the first guide means with the second guide means is preferably directed in the radial direction of the pivoting axis. The result of this is a further facilitation of the handling for a detachment/attachment of the tailgate from/to the vehicle rear of a vehicle configured according to the invention.

For the cooperation of the first guide means with the second guide means to form a translatory motion control for the tailgate, it is provided in terms of the invention, for example and in particular, that the first guide means and the second guide means for the translatory motion control are configured in a manner complementary to each other at least in sections.

As a result, this ensures in a simple manner that the coordination of the first guide means for the second guide means can be accomplished in a simple manner.

In addition, it also ensures that a translatory motion control that is almost free of play is achieved or a defined motion control can be specified for attaching the tailgate on the vehicle using the aforementioned guide means.

More precise motion control for the tailgate for the attachment thereof on the rear of the vehicle can be achieved by reducing the freedom of movement of the tailgate during this process. To this end, an advantageous further embodiment of the invention provides that the first guide means in cooperation with the second guide means forms at least in sections a linear guide (linear guidance) for the attachment of the tailgate on the rear of the vehicle.

The formation of a translatory motion control for the design of a vehicle according to the invention can be accomplished in different ways. Thus, another advantageous and expedient further embodiment of the invention provides that the first guide means in cooperation with the second guide means forms a plain bearing guide or a roller guide or a ball-bearing-mounted guide for the translatory motion control.

The aforementioned means for motion control can be configured thereby differently, for example in accordance with the type of a linear bearing. Among other things, the type of bearing also depends on the environment conditions. As a result, plain bearing guides have been proven for use in environments that prohibit a roller or ball-bearing-mounted guide.

The motion control, which results from the cooperation of the first and second guide means, can be realized in different ways. In a simple and cost-effective manner, the first guide means is set up and configured in cooperation with the second guide means to form a telescopic guide rail, such as is taken into consideration in another advantageous further embodiment of the invention.

In terms of the invention, the first guide means as well as the second guide means can be realized in different ways. It is possible to carry out the first guide means in a simple way with the aid of profile bodies, such as can be the case, for example and in particular, with rods, braces, profile bodies.

To further increase the user-friendliness of a tailgate for the attachment thereof on the rear of the vehicle, an additional further embodiment of the invention provides that at least two of the pivoting arms are coupled for movement with each other by coupling means, that the pivoting motion thereof around the pivoting axis is coordinated, in particular synchronized with each other.

This ensures that, via a pivoting of a pivoting arm, the second pivoting arm coupled for movement therewith executes a correspondingly coupled movement.

A synchronization of the movement of the pivoting arms ensures that the pivoting arms are connected to each other in a coordinated manner with respect to the pivoting motion thereof around pivoting axis. This background yields the simplification that the user merely needs to pivot a pivoting arm to be able to appropriately move the pivoting arms used to provide a motion control for the tailgate in a coordinated manner.

The motion coupling of the aforementioned pivoting arms with respect to the pivoting motion thereof around the pivoting axis can be accomplished in turn in different ways. For example, it is possible to provide gears, with which a coordination of movement can be carried out.

In terms of the invention, a further possibility for motion coupling is preferred to the effect that the coupling means comprises at least one brace, which connects at least two of the pivoting arms with each other. Against this background, the pivoting arms are coupled for movement with each other via the brace.

The brace for this purpose can be connected integrally, positively-engaged as well as adherently and also in any combination of the aforementioned types of connection. In this respect, it is possible to attach the brace on the respective pivoting arm, by, among other things, adhesive, welded, screwed, clamp connection possibilities or a combination of connection possibilities.

For this purpose, the aforementioned further embodiment of the invention takes into consideration in particular that at least one brace is connected to the at least two pivoting arms integrally and/or in a positively-engaged manner and/or adherently.

In principle, the brace can be arranged in different ways. In terms of the invention, it is preferably provided that at least one brace is arranged near the axis of the pivoting axis.

In terms of the invention, an arrangement of a brace near to the axis of the pivoting axis should be understood that the distance of the brace from the pivoting axis is less than the distance of the brace from the free end of at least one of the pivoting arms facing away from the pivoting axis. This also comprises a covering between the brace and pivoting axis.

An arrangement near to the axis ensures that, when the tailgate is detached, the space occupied by the pivoting apparatus can be minimized.

The advantage in this respect is that, when the tailgate is detached from the rear of the vehicle, only a small mandatory distance results for loading and unloading activities due to the pivoting apparatus so that an almost barrier-free loading or unloading as well as accessibility of the loading surface of the vehicle is made possible.

In addition, it produces the advantage that the rear of the vehicle has a high level of torsional stiffness and stability with a simultaneously low weight despite the detached tailgate. In this respect, a tailgate no longer must be designed as a load-bearing component for the vehicle body. This likewise produces the advantage that there is also adequate stability of a vehicle according to the invention even when the tailgate is removed from the rear of the vehicle.

In terms of the invention, the pivoting frame can be configured in diverse ways. Thus, said pivoting frame can be designed to be closed as well as open in terms of its longitudinal cross-section. In the case of an arrangement of the pivoting frame on the rear of the vehicle, the aforementioned cross-section produces a plane extending in the radial as well as the axial direction of the pivoting axis.

Basically, the pivoting arm/pivoting arms can be designed in different ways. Therefore, in terms of their cross-section, said arms can be designed to be closed as well as half-open, for example, according to a type of U-profile, as well as, for example, according to a type of T-profile or double-T profile. The aforementioned cross-section is thereby produced transverse to the longitudinal extension of the pivoting arms.

Furthermore, additional design possibilities are possible for the pivoting arm or pivoting arms or the pivoting frame.

Based on the idea of further simplifying the attachment of the tailgate on the rear of the vehicle, the aforementioned advantageous further embodiment of the invention takes into consideration in particular that the at least two pivoting arms, which are connected to each other with at least one brace, form a pivoting frame that is U-shaped in particular.

This type of design of the pivoting frame produces a rigid and almost barrier-free loading possibility for the loading surface of the vehicle.

The advantage of this is that the tailgate is easier to handle when it is attached on the rear of the vehicle. The pivoting frame ensures that the alignment of the tailgate on the pivoting frame is simplified. As a result, the attachment of the tailgate by merely one person is further simplified.

It has likewise been proven to be advantageous, in particular with respect to the structural expense, that a vehicle configured according to the invention comprises a pivoting frame, which is designed to have a U-like shape or be U-shaped in terms of its longitudinal cross-section, the at least two parallel pivoting arms thereof being used to form the motion control for the tailgate, along which the tailgate can be movably guided for attachment on the rear of the vehicle between the initial position and the target position.

The motion control likewise facilitates an easier detachment of the tailgate from the rear of the vehicle.

The aforementioned further embodiment of the invention has the advantage that it also succeeds, in terms of a loading and unloading of the loading surface of the vehicle, in keeping the distance from the loading surface small for example for a fork lift as soon as the tailgate is detached from the pivoting frame.

In addition, the advantage is yielded that the structural expense for realizing a pivoting frame for a vehicle according to the invention can be reduced to a low level so that there are also cost advantages in realizing a vehicle configured according to the invention.

In terms of the invention, a longitudinal cross-section of the pivoting frame should be understood as a cross-section that is produced in the direction of the longitudinal and traverse extension of the pivoting frame.

The longitudinal and traverse extension of the pivoting frame is determined by the respective outer dimensions thereof, which are dimensioned larger as compared to the depth extension. Therefore, for example and in particular, in the case of a horizontal open position, in which the tailgate is aligned with a horizontal plane, a longitudinal cross-section according to a horizontal plane is yielded.

In this respect, as an advantageous further embodiment, the invention comprises that the pivoting frame is open facing away in the longitudinal cross-section thereof from the loading surface of the vehicle in order to keep the aforementioned minimum distance with a removed tailgate as small as possible for example for a fork lift or for loading and unloading the loading surface.

Furthermore, it is advantageously ensured according to the invention that the opening that is provided on the rear of the vehicle for the tailgate is reduced only marginally in terms of its dimensions in the case of a pivoting frame arranged on the rear of the vehicle. In this connection, it is also possible to use climbing aids/steps, which are not useable or accessible when the tailgate is attached on the rear of the vehicle, in particular in the open state thereof. This applies analogously to the pivoting arms that are not connected to each other. Therefore, the pivoting frame or the pivoting arms can remain on the vehicle without the tailgate being attached to the rear of the vehicle.

As already stated, a pivoting frame of a vehicle configured according to the invention can be designed in different ways.

For example, it is possible for the pivoting frame to be formed from different braces, which are screwed, welded or adhered together with each other for example.

Therefore, it is possible to create a corresponding pivoting frame of a vehicle configured according to the invention via an adherent and/or integral and/or positively-engaged connection of braces or components of a corresponding pivoting frame.

In addition, it is possible to design a corresponding pivoting frame of a vehicle according to the invention as a cast part, for example as a metal cast part or a plastic injection molded part.

In order to design the pivoting frame as rigidly as possible, prevent undesired deformations under load as much as possible and keep the manufacturing costs or effort for manufacturing low, the aforementioned advantageous further embodiment of the invention provides in particular that the pivoting frame is configured to be one piece.

Against this background, the advantage of simplified handling for maintenance processes is produced for example, along with a high level of stability of the pivoting frame.

In this respect, a pivoting frame of a vehicle configured according to the invention can be designed as cast part or injection molded part. In addition, it is possible to design a corresponding pivoting frame as a welded construction so that the individual components of the pivoting frame are welded together.

Furthermore, it is also possible in terms of the invention to realize the pivoting frame as a formed part in order to thus create a pivoting frame in forming processes from profile bodies for example.

Therefore, a pivoting frame can be produced by, among other things, forming and prototype processes as well as by means of integral connections such as soldering, adhesion or welding, for example.

The design of a corresponding pivoting frame as a one-piece component produces the advantage that the production of a pivoting frame for a vehicle configured according to the invention is simplified and cost-effective. In addition, the mounting or dismounting thereof on the vehicle is simplified.

In terms of the material selection, different materials can likewise be relied on. For example, glass-fiber materials, metals as well as non-metals and plastics can be used to form the inventive pivoting arms or braces as well as the pivoting frame.

Particularly suitable because of the low cost as well as a favorable processability and advantageous material properties are metal materials, which favor a simple processability as well as connectability.

As a result, it is possible according to the invention to realize the pivoting frame of a vehicle configured according to the invention at least in sections of a metal, plastic or other suitable material as well as a combination of different materials.

In order to largely prevent damage to the vehicle as well as to the tailgate in a safe manner, means is provided for pivot limitation, which limit the pivotability of at least one of the pivoting arms or the pivoting arms or the pivoting frame around the pivoting axis.

The means for pivot limitation is used to realize a limitation of the pivoting of the pivoting arm/pivoting arms or the pivoting frame or the tailgate with the arrangement thereof on the rear of the vehicle at least with respect to reaching an open position.

Consequently, it is advantageously ensured that a limitation of the pivoting motion of the tailgate in the direction of the open position is possible in a simple manner so that an end position can be specified or predefined for the tailgate when reaching a predetermined position.

The advantage of this is that an unnecessary damage of the vehicle according to the invention as well as of the tailgate or pivoting apparatus thereof can be avoided.

In addition, it is advantageously ensured that an enlargement of the loading surface of the vehicle according to the invention can be realized because of a tailgate in a predetermined open position.

Furthermore, it is possible to use different types of tailgate implementations to design the vehicle rear of a vehicle configured according to the invention or to use the loading surface without the means for the pivot limitation having to be adapted in a complex way for this.

For example, a cable, in particular a wire cable, can be used in a simple way, which cable can be arranged with the one free end thereof on the vehicle body of a vehicle configured according to the invention and with the remaining free end thereof on the at least one pivoting arm or pivoting frame.

In terms of the invention, it is possible to conceal the means for pivot limitation visually via the pivoting arms at least in sections, in particular in a closed position of the tailgate.

A pivoting motion limitation for a tailgate can be realized in different ways. Therefore, it is also possible, among other things, to provide a pivoting motion limitation on the pivoting axis of the tailgate, for example, in that the hinges/joints in question, which permit a pivoting of the tailgate on the rear of the vehicle, are set up and configured to limit a pivotability of the tailgate.

In this respect, the aforementioned advantageous further embodiment of the invention takes into consideration in particular that the means for pivot limitation comprises at least one brace or a link/joint rod or a cable or a band or a chain, the one free end of which is held on the vehicle body side and the remaining free of which is held on at least one pivoting arm, in a tension-proof manner in particular.

Against this background, it is ensured that the pivoting arm/pivoting arms or the pivoting frame can be positioned and held, by making possible a simple attachment or detachment of the tailgate to/from the vehicle rear of a vehicle configured according to the invention.

So as not to impair the visual quality of the vehicle, another advantageous further embodiment of the invention provides that at least one of the pivoting arms, preferably both pivoting arms, or the pivoting frame, is arranged at least in sections in a gap present between the tailgate and the lateral parts of the rear of the vehicle, which was already explained in the forgoing. According to the invention, lateral parts of the rear of the vehicle limit the loading surface transverse to the vehicle's longitudinal axis.

In terms of the invention, the longitudinal axis of the vehicle is characterized in that said axis is directed from the rear of the vehicle to the front of the vehicle or from the rear wheels of the vehicle in the direction of the front wheels of the vehicle. The direction of travel (forward as well as backward) of the vehicle is likewise determined by the longitudinal axis of the vehicle.

The aforementioned further embodiment also ensures that the pivoting arm/pivoting arms or the pivoting frame cannot be seen directly in the closed position of the tailgate and is covered by the tailgate at least in sections so that it/they is/are not immediately identifiable to an observer of the rear of the vehicle or visually noticeable or apparent on the rear of the vehicle.

To this end, another advantageous further embodiment of the invention provides that the pivoting arm/the pivoting arms or the pivoting frame is/are designed such that and arranged on the rear of the vehicle so that the pivoting arm/pivoting arms or the pivoting frame is/are covered by an outer surface of the tailgate at least in sections, in particular to a large extent, preferably completely.

Along with visual advantages, it is likewise advantageously ensured that the pivoting arm/the pivoting arms or the pivoting frame do not unnecessarily impair function carriers on the outer surface of tailgate in terms of their functioning. In addition, it is advantageously ensured that the function of the tailgate is not impaired by the arrangement of the pivoting frame.

According to the invention, an outer surface of the tailgate is the surface of the tailgate, which, in the closed position thereof, faces away from the loading surface or the loading area of the vehicle.

To arrange the tailgate on the pivoting frame and be able to move it relative thereto, an advantageous further embodiment of invention provides that the second guide means has at least one, in particular three, preferably four, guide pin(s), of which at least one guide pin is arranged on at least one of the lateral flanks of the tailgate, which guide pins cooperate with the first guide means for the translatory motion control for attaching the tailgate on the rear of the vehicle.

In this way, it is possible for the tailgate to be held on the pivoting frame by guide means that is correspondingly provided for this purpose in order to be able to align or position the tailgate.

For this purpose, it is likewise possible to appropriately design the tailgate in order to correspondingly configure guide means.

However, in order to be able to redesign already existing vehicles with original tailgates using the invention, it is possible to use already existing function carriers for a hold on the pivoting frame.

In this respect, recesses, among others, such as threaded holes or boreholes can be used to introduce a pin or a screw to form a guide pin.

As a result, this also yields the advantage that the aforementioned screw along with similar connection/fastening means can like be used to hold or fix the tailgate on the pivoting frame of a vehicle configured according to the invention.

For a secure hold of the tailgate on the rear of the vehicle, the guide means can be designed differently.

Basically, one guide pin is sufficient here, however, the use of two as well as also four guide pins is preferred. They are arranged in particular on the lateral flanks of the tailgate, each of which is facing a vehicle side in the case of the arrangement of the tailgate on the rear of the vehicle.

Other guide means can also be configured in an analogous manner.

For additional cost advantages, another advantageous further embodiment of the invention provides that the tailgate can be fastened on the pivoting arm/pivoting arms or on the pivoting frame by means of at least the second guide means, in particular by means of at least one guide pin.

As a result, it is ensured advantageously that the guide means is not just used for the function of being able to guide the tailgate on the pivoting arm/pivoting arms or the pivoting frame, but also for a secure hold on the pivoting frame.

Against this background, it is also advantageously ensured that no additional means is mandatory for holding the tailgate on the pivoting arm/pivoting arms or the pivoting frame.

The result is that at least one of the second guide means can assume a dual function thereby making it possible to reduce the number of required individual parts.

For a secure hold of the tailgate on the vehicle rear of a vehicle configured according to the invention, a further embodiment of the invention provides, for example and in particular, that at least one of the pivoting arms comprises at least one guide groove, which cooperates with the guide means of the tailgate such that the translatory motion control of the tailgate is directed radially to the pivoting axis.

To this end, the guide groove in particular is set up and configured such that the guide pins or the like of the tailgate, which can form the second guide means, project [therein] in the target position at least in sections and thereby reduce at least one degree of freedom of movement of the tailgate, in particular transverse to the longitudinal extension of the pivoting arm.

As a result, it is advantageously ensured that a secure hold of the tailgate on the pivoting arm/on the pivoting arms or on the pivoting frame is guaranteed by the invention. Therefore, the groove for example can be configured in terms of its progression to be L-shaped, T-shaped, C-shaped, U-shaped.

Further designs are yielded analogously.

For a simple positioning of the tailgate on the rear of the vehicle, the invention provides a positioning aid, which can be configured in different ways. It is used to specify the target position, in which the tailgate is arranged to fulfill its function or intended purpose on the rear of the vehicle so that an involved alignment of the tailgate can be eliminated.

It can be realized in a simple manner by a limitation of the travel of the translatory motion control, for example by means of a limit stop, which forms a target position for the tailgate.

Consequently, another advantageous further embodiment of the invention provides that the pivoting apparatus, in particular the first guide means or the second guide means, comprises a positioning aid for attaching the tailgate on the rear of the vehicle, in particular a limit stop for limiting the travel of the tailgate, through which the target position is specified for the tailgate, wherein the positioning aid is preferably configured or arranged on at least one guide groove.

In terms of the invention, a vehicle can also be configured such that an already finished vehicle or existing vehicle or even a used vehicle can be retrofitted with a pivoting apparatus formed with first guide means or second guide means according to the invention without the geometry or outer design of the vehicle or tailgate having to be subject to restrictions, which means a high expense for modifications.

In this connection, the invention also includes that the vehicle is retrofitted with first guide means or second guide means, whereby said means is added retroactively to an existing vehicle after its manufacture to form a vehicle according to the invention.

This yields the advantage that an already existing vehicle known from the prior art can be converted in a simple manner to a vehicle configured according to the invention.

The invention will be explained in greater detail in the following based on the attached drawing, in which embodiments of a vehicle according to the invention are shown representatively for a plurality of possibilities for forming a vehicle according to the invention.

In this case, all features claimed, described and depicted in the drawing taken in their own right or in any combination with one another form the subject matter of the invention, independent of the summarization thereof in the patent claims and back references thereof as well as independent of their description or representation in the drawing.

The figures of the drawing show the embodiments of a vehicle configured according to the invention always in a schematic representation. Therefore, the representations are not true to scale in particular and, for the purpose of a better overview, are reduced to the elements/structural parts/components that support understanding.

The same or corresponding structural parts/components or elements are provided with the same reference signs in the figures. Furthermore, for the purpose of a better overview, the description is reduced to the differences between the depictions in the figures.

For a better overview, all reference signs are not always given in the figures, wherein [for] a simple allocation, the same components/elements are depicted the same way or corresponding to the respectively selected view.

In addition, for a simpler orientation, reference signs may be included in individual figures that are first explained in the following in terms of a different figure.

The embodiments of a vehicle configured according to the invention are designated in the following in an abbreviated manner also as "vehicle".

The drawing shows:

FIG. 1 A schematic representation with reduced detail of a first embodiment of a vehicle according to the invention in a side view in which the tailgate is situated in a closed position.

Figure 2:
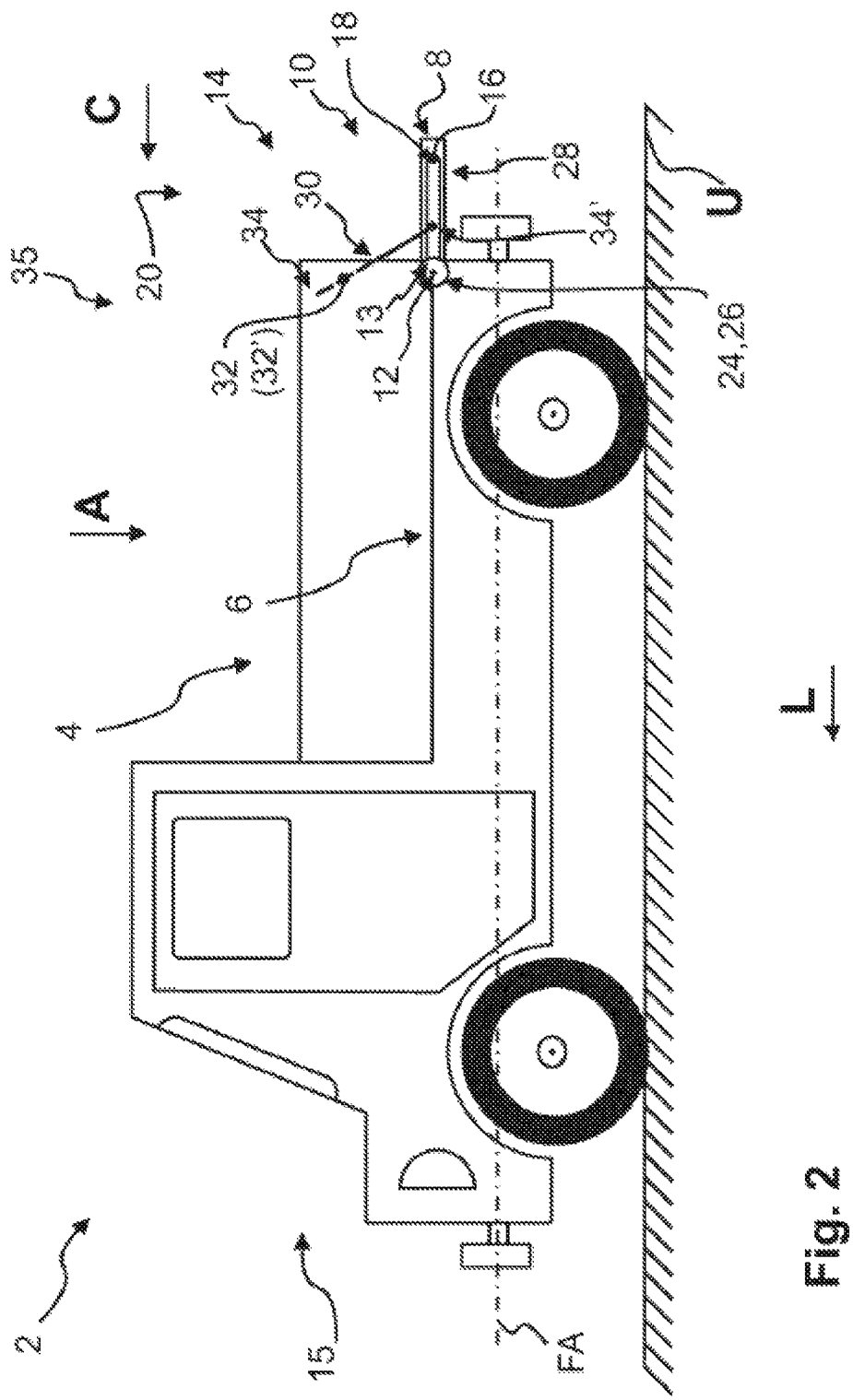

FIG. 2 A schematic representation with reduced detail of the vehicle from FIG. 1 with a tailgate, which is situated in an open position, in an otherwise similar depiction as in FIG. 1.

Figure 3:
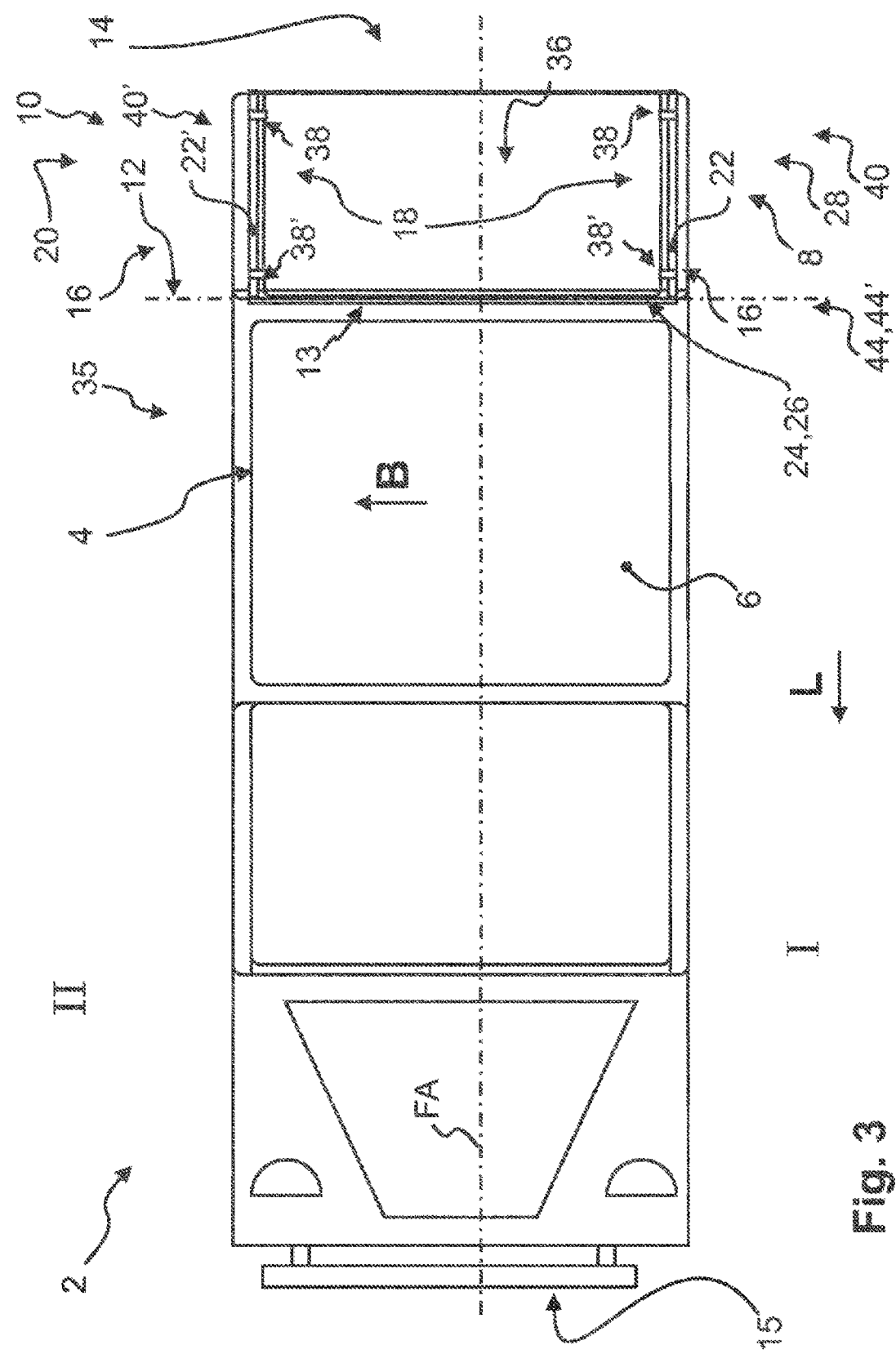

FIG. 3 A schematic representation with reduced detail of the vehicle from FIG. 2 in the view identified by A in FIG. 2.

Figure 4:
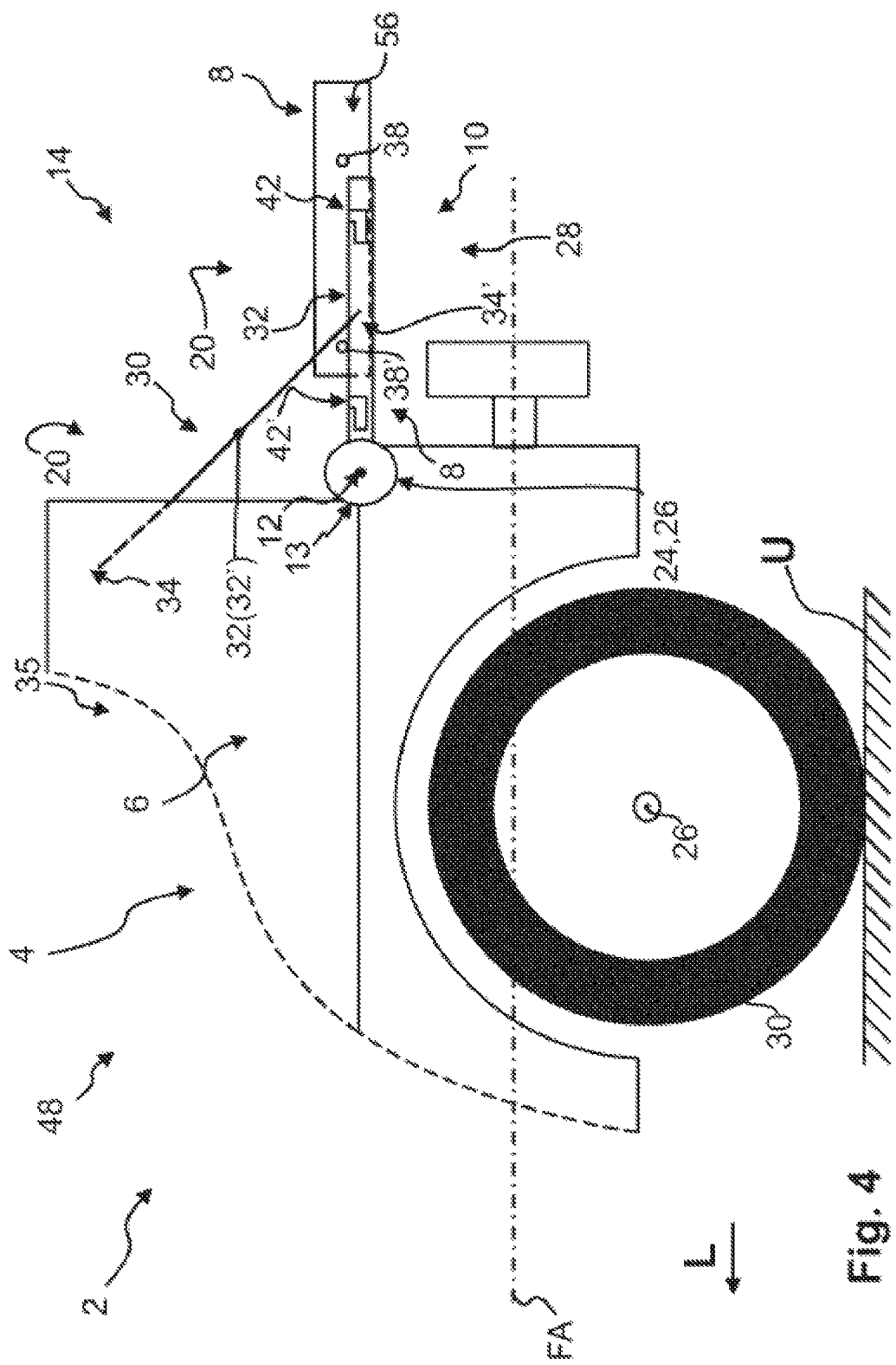

FIG. 4 A schematic representation with reduced detail of a section of the vehicle shown in FIG. 2, which relates to the rear section of the vehicle, wherein the depiction is enhanced with additional representational details as compared to FIG. 2 and the tailgate is situated in an initial position.

Figure 5:
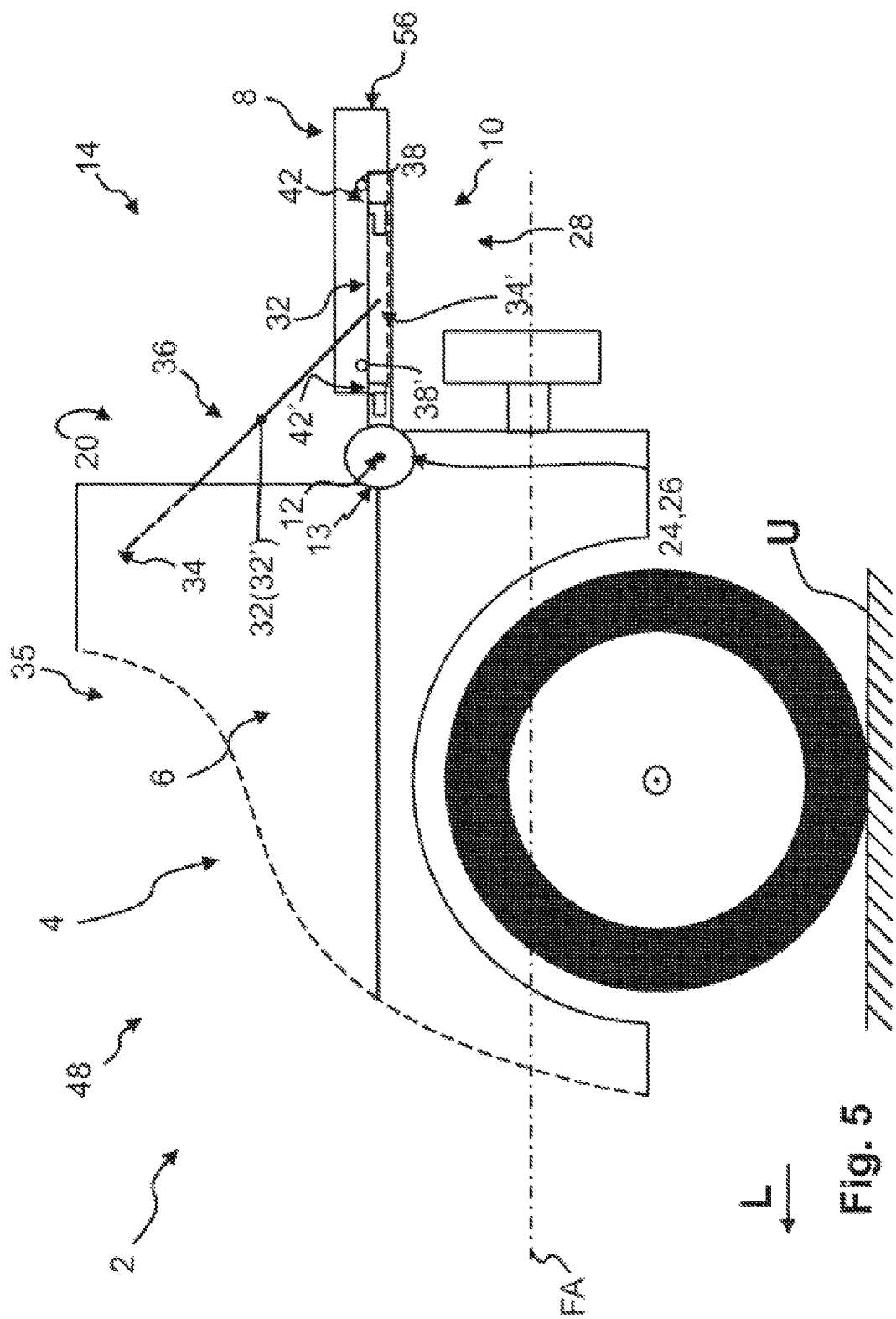

FIG. 5 The vehicle depicted in FIG. 4 in a representational format corresponding to FIG. 4, in which the tailgate is situated in another initial position.

Figure 6:
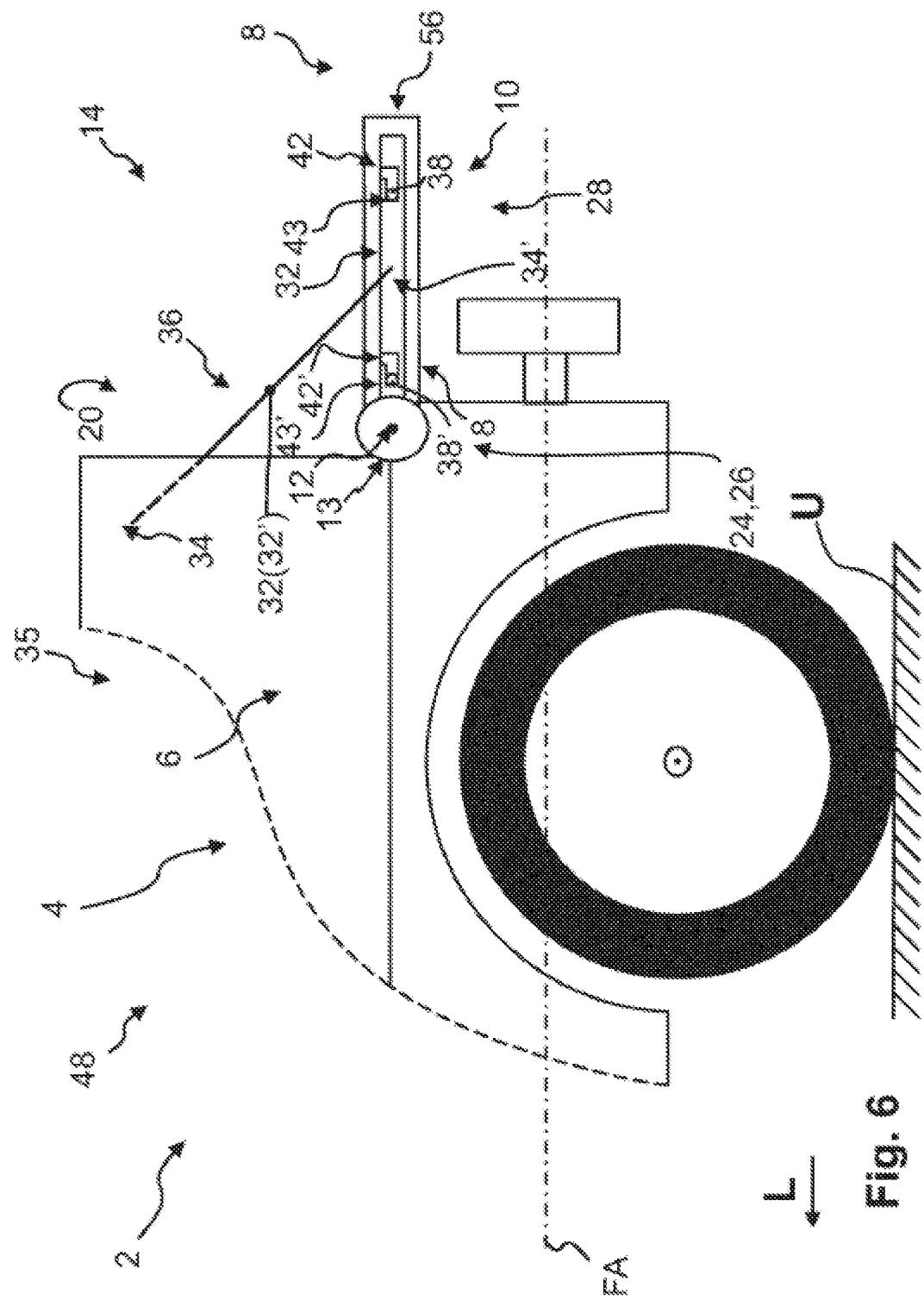

FIG. 6 The vehicle from FIGS. 4 and 5 in a corresponding representational format as in the aforementioned figures, wherein the tailgate is situated in a target position.

Figure 7:
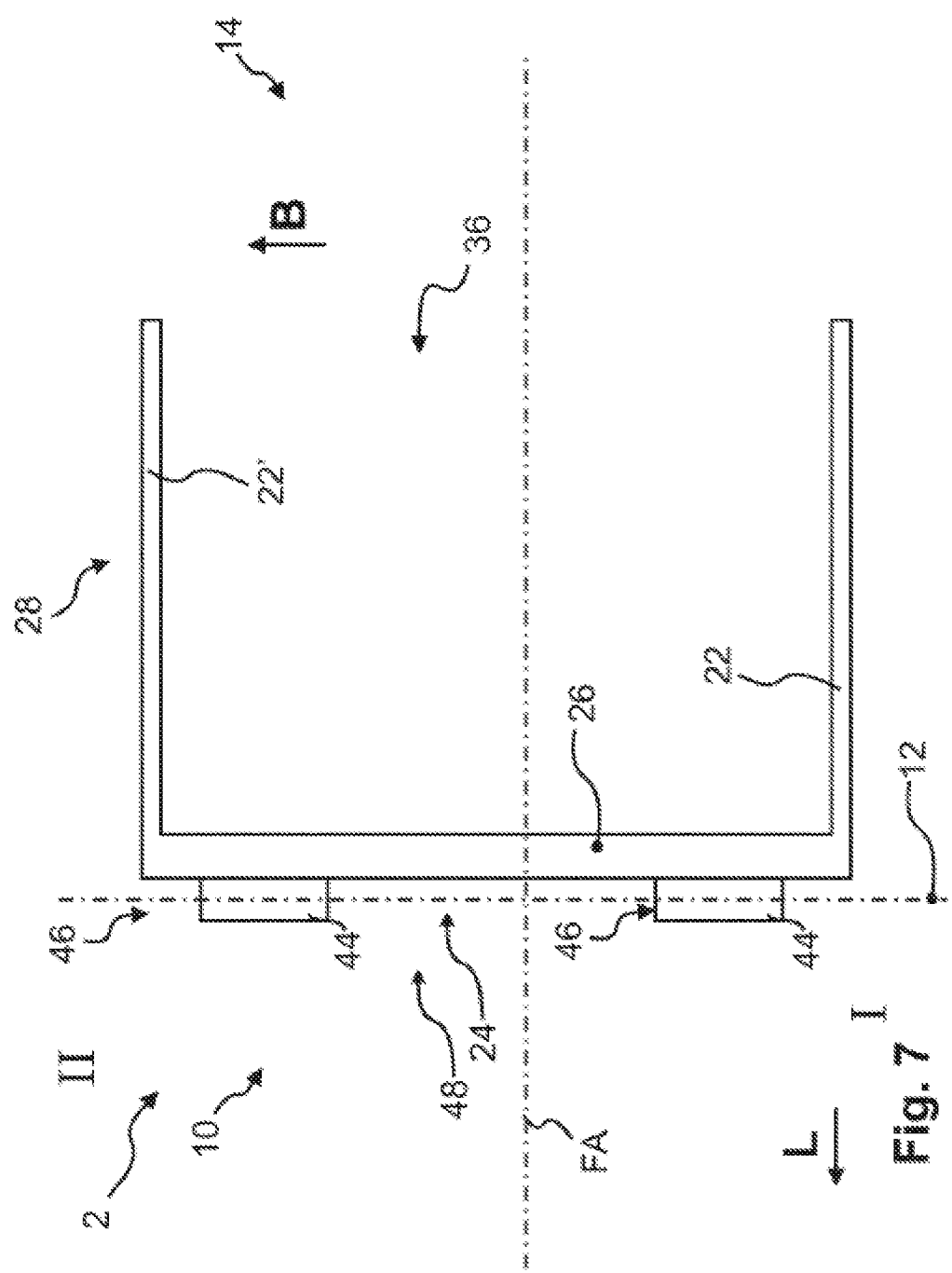

FIG. 7 A schematic representation with reduced detail of the vehicle in a view according to FIG. 3, wherein the depiction is concentrated on the pivoting frame along with the hinge component.

Figure 8:
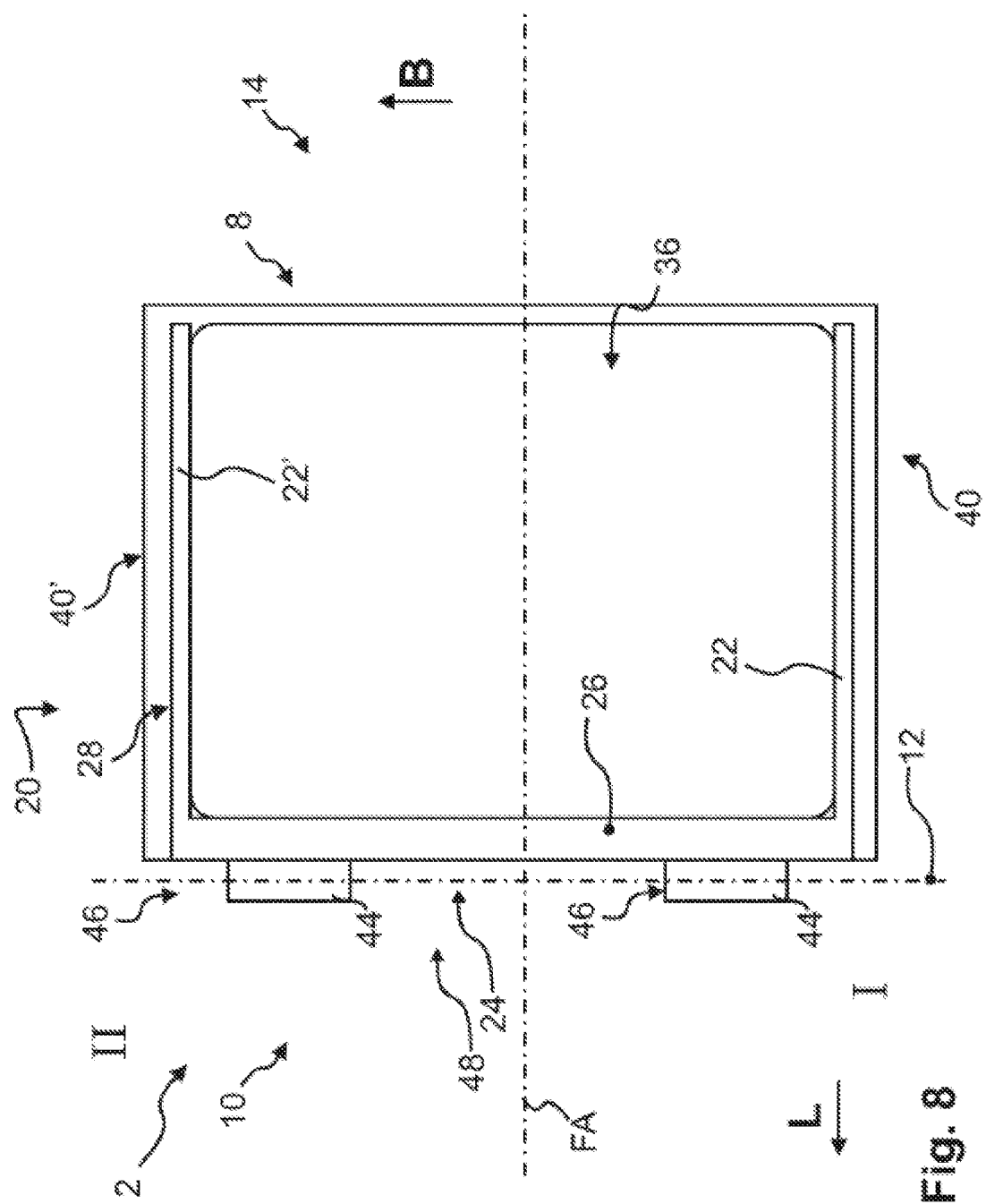

FIG. 8 The view depicted in FIG. 7 of the pivoting frame with the tailgate arranged thereon in the target position, again in a schematic representation with reduced detail.

Figure 9:
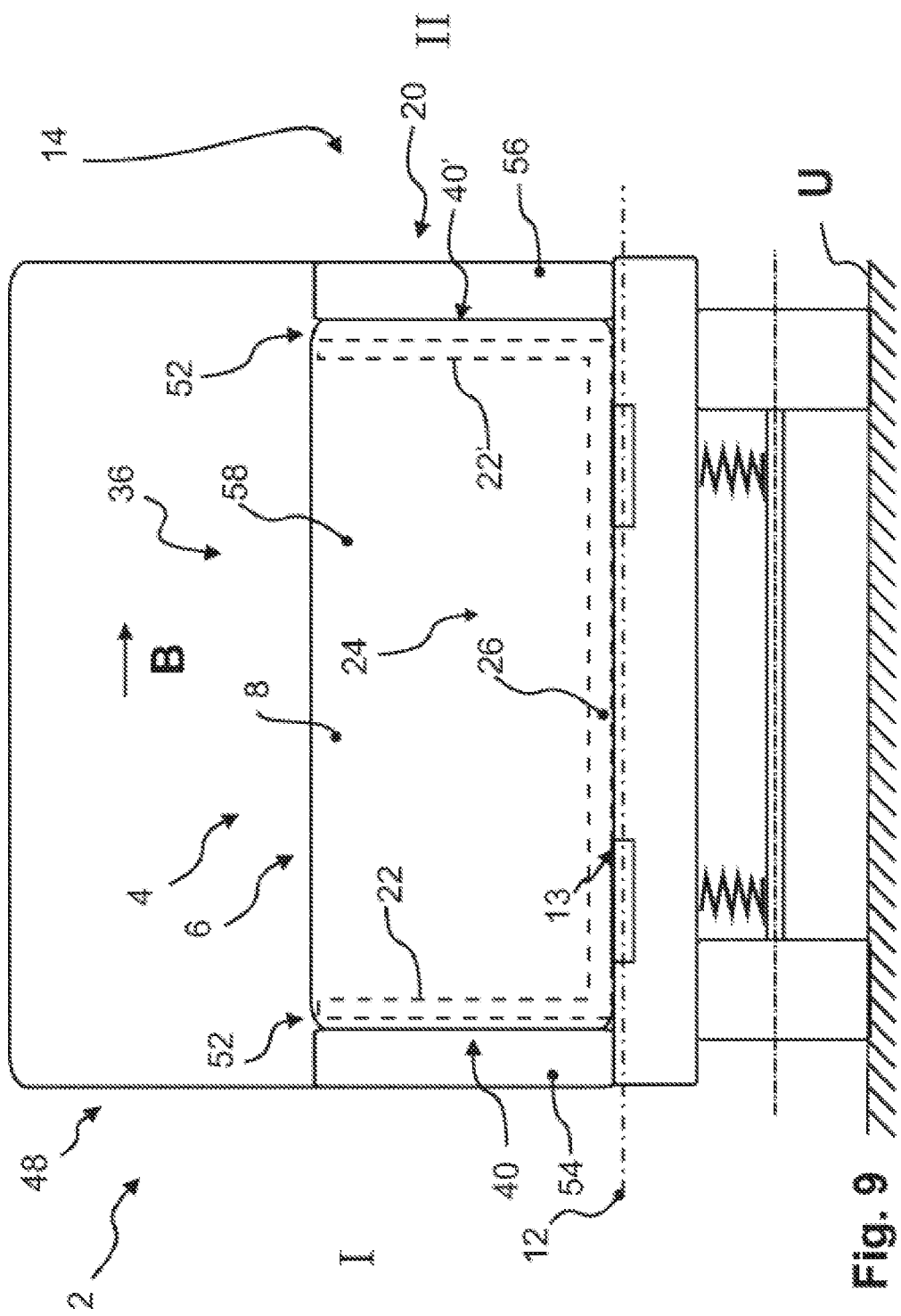

FIG. 9 The vehicle from FIG. 1 in a view identified there by C, wherein the schematic representation has reduced detail and is concentrated on the pivoting frame along with the hinge components and the tailgate.

Figure 10:
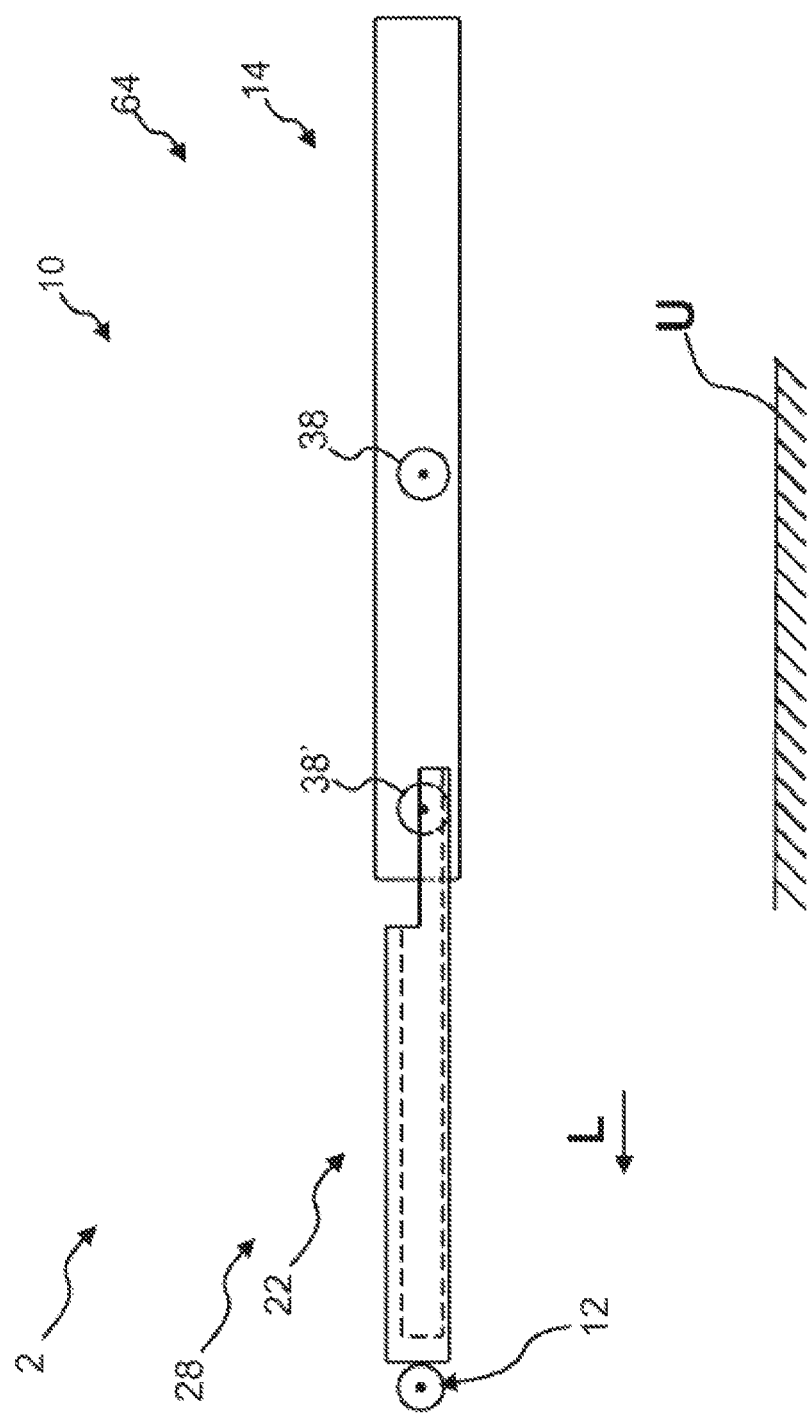

FIG. 10 A second embodiment of a vehicle according to the invention in a section analogous to the vehicle shown in FIG. 2, again in a schematic representation with reduced detail analogous to FIG. 4, wherein the depicted section is concentrated on the rear section of the vehicle and wherein the tailgate is situated in an initial position.

Figure 11:
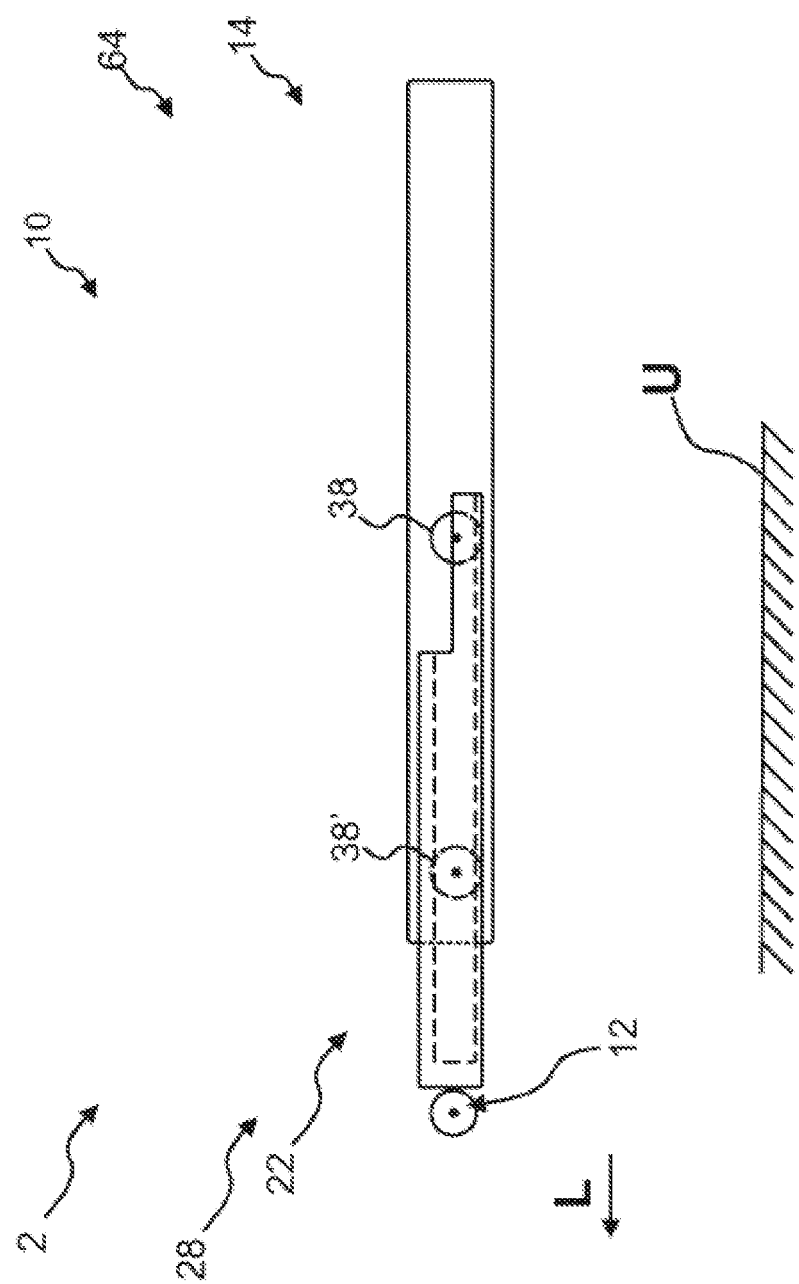

FIG. 11 The vehicle depicted in FIG. 10 in a corresponding representational format as in FIG. 10, in which the tailgate is situated in another initial position.

Figure 12:
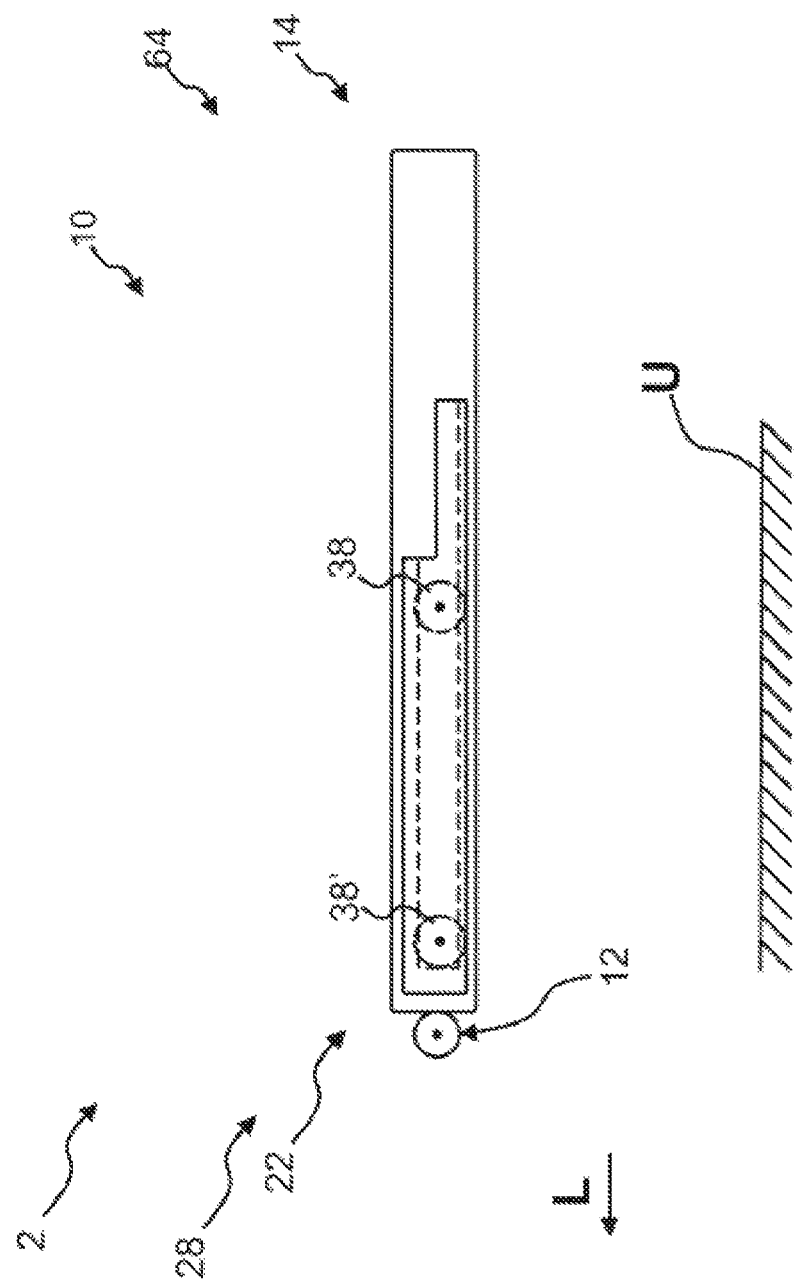

FIG. 12 The vehicle from FIGS. 10 and 11 in a corresponding representational format as in the aforementioned figures, wherein the tailgate is situated in a target position.

Figure 13:
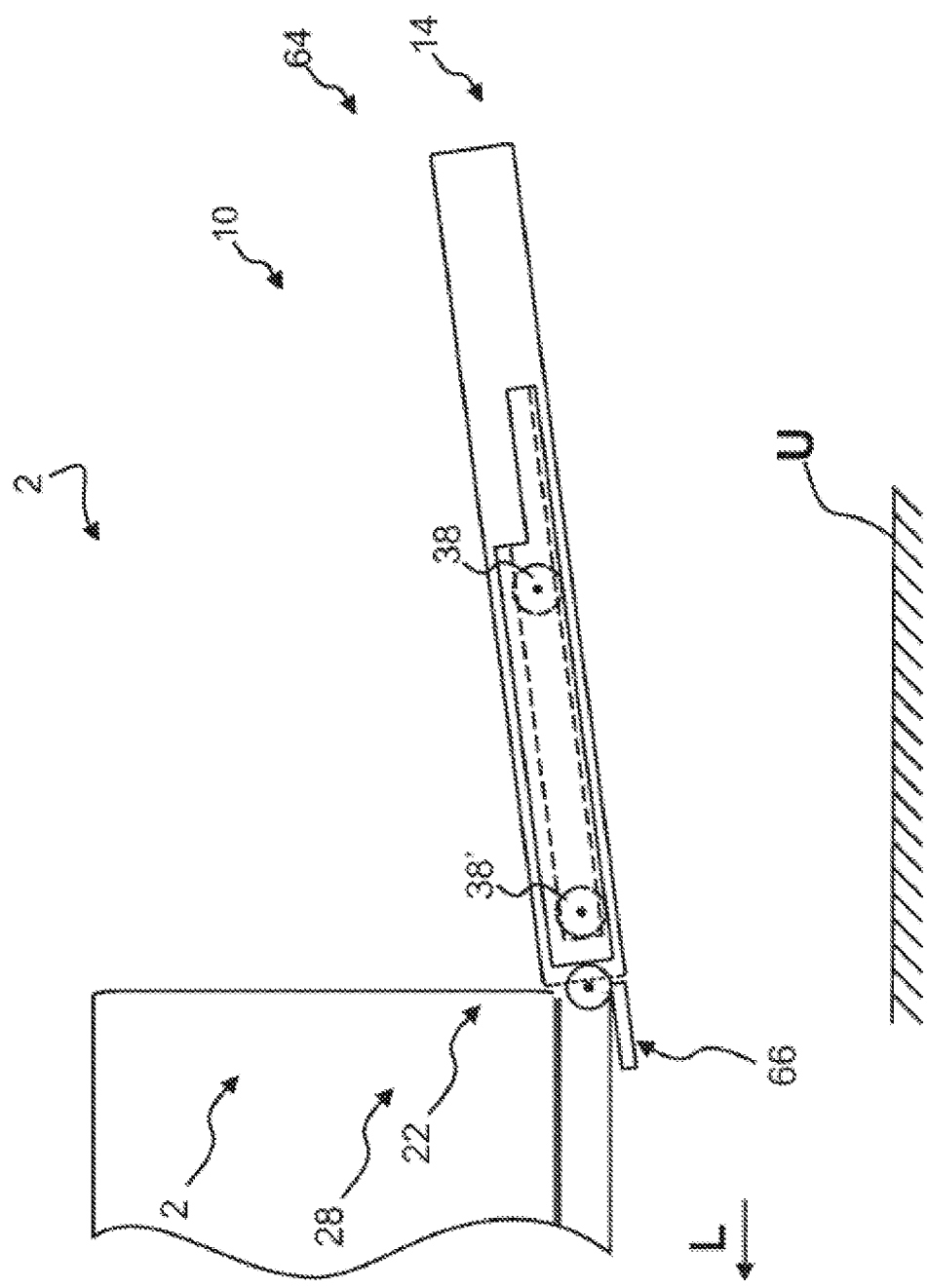

FIG. 13 A third embodiment of a vehicle according to the invention in a section analogous to the vehicle depicted in FIG. 2, again in a schematic representation with reduced detail, wherein the depicted section is concentrated on the rear section of the vehicle and the tailgate is in an approximation of a structurally specified open position.

FIG. 14 The vehicle depicted in FIG. 13 in a corresponding representational format as in FIG. 13, in which the tailgate is situated after reaching the open position.

FIG. 15 The first embodiment of a vehicle according to the invention from FIG. 1 in a view identified by A in FIG. 1, wherein the tailgate is in a closed position.

For the sake of simplicity and a better overview, the following statements are related to the differences between the representations or embodiments.

FIG. 1 shows a first embodiment of a vehicle configured according to the invention 2, which is a so-called pickup.

The vehicle 2 depicted in FIG. 1 comprises a so-called flat bed 4, as was already designated at the outset, to form an uncovered loading surface 6.

To limit the loading surface 6 on the rear side, the vehicle 2 in turn comprises a tailgate 8, which is arranged in a pivotable manner on the rear of the vehicle 14, by means of a pivoting apparatus 10 around a pivoting axis 12 between a closed position, in which it limits a loading surface 6 of the vehicle 2 on the rear side, and an open position, in which its opens a loading surface 6 on the rear side.

The pivoting axis 12 extends along the loading edge 13 and is spaced apart therefrom in a parallel manner.

First of all, the pivoting apparatus 10 comprises first guide means 16, which is arranged on rear of the vehicle 14 and which cooperates with the second guide means 18, which is arranged on the tailgate 8, for translatory motion control of the tailgate 8 for attachment thereof on the rear of the vehicle 14. The front of the vehicle is identified by reference sign 15.

The vehicle longitudinal axis FA is used for easy orientation for the arrangement of the components of the vehicle 2 and is yielded in the direction from the rear of the vehicle 14 to the front of the vehicle 15. The same is used to identify the width extension B (see FIG. 3), in which the tailgate 8 as well as a corresponding opening for the tailgate 8 extends on the rear of the vehicle 14 in an axial direction to the pivoting axis 12.

The cooperation takes place in such a way that the tailgate 8 is guided movably between an initial position and a target position. The translatory motion control of the tailgate is set up and configured in the case of the vehicle 2 in such a way that the tailgate is motion-controlled via the first guide means 16 in cooperation with the second guide means 18 for attachment of said tailgate in the radial direction to the pivoting axis 12.

In an initial position, the first guide means 16 and the second guide means 18 are brought together for translatory motion control of the tailgate 8 on the rear of the vehicle 14.

Consequently, the result for the target position is that the tailgate 8 is arranged on the rear of the vehicle 14 to properly fulfill its function, and in this arrangement is able to be fastened to the vehicle with fastening means (not shown).

To this end, the first guide means 16 and the second guide means 18 for the translatory motion control are configured in a manner complementary to each other at least in sections.

In addition, the aforementioned arrangement of the guide means 16, 18 in relation to each other ensures that the first guide means 16 in cooperation with the second guide means 18 forms at least in sections a linear guide 20 for the attachment of the tailgate 8 on the rear of the vehicle.

The first guide means 14 thereby has two pivoting arms 22, 22' arranged on the vehicle 2 pivotably around the pivoting axis 12, which pivoting arms are each longitudinally extended radial to the pivoting axis 12 and each form a guide part in order to cooperate with the second guide means 18, which forms the other guide part of the linear guide 20, for the translatory motion control of the tailgate 8.

The pivoting arms 22, 22' are thereby arranged spaced apart from each other in the direction of the pivoting axis 12 and coupled for movement with each other by coupling means 24 in such a way that the respective pivoting motion thereof around the pivoting axis 12 is coordinated and, in this embodiment of a vehicle according to the invention 2, synchronized with each other.

For the motion coupling 24, the coupling means 24 comprises at least one brace 26, which mechanically connects the pivoting arms 22, 22' with each other.

To this end, the brace 24 is connected integrally with the two pivoting arms 22, 22'.

As is evident in FIG. 3, among others, the two pivoting arms 22, 22' together with the brace 26 form a U-shaped pivoting frame 28, in which the brace 26 and the pivoting arms 22, 22' are connected to each other to form a one-piece pivoting frame 28 by means of welded connections.

FIG. 2 shows the vehicle 2 from FIG. 1 again in a side view as well as in the same representational format as in FIG. 1.

In contrast to FIG. 1, the tailgate 8 is situated in an open position, in which it makes a loading and unloading of the loading surface 6 possible on the rear side, for which it opens the loading surface 6 on the rear side and therefore makes the rear side accessible.

In the depicted open position of the tailgate 8, the means for pivot limitation 30 of the pivoting arms 22, 22' or of the pivoting frame 28 is provided in the depicted embodiment of a vehicle configured according to the invention 2, which means ensures that a pivoting of the pivoting arms 22, 22' or of the pivoting frame 28 is limited at least in the direction of the open position of the pivoting arms 22, 22' or of the pivoting frame 28.

In the direction of the closed position of the tailgate 8, the means for pivot limitation 30 provides for stopping means (not shown), which prevents a pivoting of the tailgate 8 beyond the closed position.

The concrete design of stopping means for the tailgate 8 is known to a person skilled in the art and does not require any further explanation.

In addition, the means for pivot limitation 30 comprises two cables 32, 32', the one free end 34 of which is arranged on a vehicle body 35 of the vehicle 2 and the remaining free end 34' is arranged on the pivoting frame 28.

One of the cables 32 is thereby arranged on the driver's side I (see FIG. 3) and the other cable 32' on the remaining vehicle side II (see FIG. 3). The respective free ends 34, 34' of the cable 32, 32' are identified with reference signs 34, 34' for a simple overview.

In principle, using only one of the cables 32, 32' is sufficient, however, because of the selected two cables 32, 32', the load-bearing capacity of the pivot limitation or the load-bearing capacity of the tailgate 8 is increased.

Because of the side view, only one of the cables 32 is visible in FIG. 1. The same applies to components/elements, which are arranged on the vehicle side II that is not visible in FIG. 2 or are only visible from said vehicle side.

FIG. 3 shows the vehicle 2 from FIGS. 1 and 2 in a view identified by A in FIG. 1 (top view).

FIG. 3 shows that the pivoting frame 28 is set up and configured so that the tailgate 8 is movably guided between an initial position and a target position via the pivoting frame 28 for the attachment thereof to the vehicle 2.

To this end, the two parallel pivoting arms 22, 22' of the first guide means 14 for the attachment of the tailgate 8 on the rear of the vehicle 14 form the pivoting frame 28, along which the tailgate 8 is movably guided between an initial position and a target position for attachment thereof to the rear of the vehicle 14.

The attachment of the tailgate 8 is illustrated in more detail in FIGS. 4 to 6 and will be explained in greater detail in the following based on said figures.

As FIG. 3 shows, the pivoting frame 28 is opened facing away in its longitudinal cross-section of the loading surface 6 of the vehicle 2. The opening 36 of the pivoting frame 28 that is thereby created makes the loading surface 6 of the vehicle 2 better accessible, in that a barrier specified in open position of the tailgate 8, when the tailgate 8 is away from the pivoting frame 28, is kept as small as possible for accessibility to the loading surface 6.

So that the tailgate 8 is guided moveably on the pivoting frame 28, in the case of the embodiment of a vehicle configured according to the invention 2, the second guide means 18 comprises four guide pins 38, 38' (for pivoting arm 22, 22', identified uniformly with the reference sign 38, 38').

They are arranged on the lateral flanks 40, 40' of the tailgate 8 so that the tailgate 8 can be moved via the second guide means 18 or guide pins 38, 38' for the attachment thereof on the rear of the vehicle 14 on the pivoting frame 28.

For a better overview, the guide pins 38, 38' are identified in the figures in accordance with the reference sign 38, 38' for each pivoting arm 22, 22'.

The tailgate 8 supports itself on the pivoting frame 28 via the aforementioned second guide means 18 or the guide pins 38, 38' thereby preventing the tailgate 8 from approaching the ground U in an undesired manner due to the gravity in effect and getting damaged in the process.

The second guide means 18 thereby comprises a guide pin 38', via which the tailgate 8 can be fastened on the pivoting frame 28 so that it is fixed on the pivoting frame 28 and an undesired movement of the tailgate 8 relative to the pivoting frame 28 is inhibited.

FIG. 4 shows a section of the rear of the vehicle 14 in a side view of the vehicle 2 that is analogous to FIGS. 1 and 2.

FIG. 4 depicts the tailgate 8 in an approach position, in which the tailgate 8 is guided to the pivoting frame 28 for the translatory motion control thereof.

The tailgate 8 supports itself thereby on the pivoting frame 28 to simplify the attachment on the rear of the vehicle 14 first by means of a guide pin 38', which, as previously described, is arranged laterally on the tailgate 8.

In FIG. 5, the vehicle 2 from FIG. 4 is depicted in the same representational format as in FIG. 4. In the depiction in FIG. 4, the tailgate 8 is situated in an initial position, in which it rests on or is supported on the pivoting frame 28 by means of the second guide means 18 or the guide pins 38, 38'.

The initial position according to the invention prevents the tailgate 8 from moving in an uncontrolled manner in the direction of the gravity in effect and thereby approaching the ground U.

FIG. 6 shows the vehicle 2 in the same representational format as in FIGS. 4 and 5.

In contrast to the aforementioned figures, tailgate 8 is situated in a target position, in which the tailgate 8 has reached the desired arrangement on the rear of the vehicle 14 so that the tailgate 8 can be fastened to the pivoting frame 28.

To determine a target position for the tailgate 8, the pivoting arms 22, 22' each comprise two guide grooves 42, 42', which are set up and configured in such a way that the guide pins 38, 38' (or a portion thereof) project therein at least in sections when approaching the target position and thereby reduce the freedom of movement of the tailgate 8 by a degree of freedom of movement of the tailgate 8, in this case transverse or vertical to the longitudinal extension L of a respective pivoting arm 22, 22'.

As soon as the guide pins 38, 38' [reach] the end of a guide groove 42, 42', the tailgate is situated in the target position so that the respective end of a guide groove 42, 42' forms a limit stop 43, 43' for limiting the travel of the tailgate 8 in one direction, through which the target position is specified for the tailgate 8.

As a result, the pivoting apparatus 10 or the first guide means or the second guide means 18, comprises a positioning aid 43, 43' for attaching the tailgate to the rear of the vehicle. For the sake of simplicity and a better overview, the respective positioning aid 43, 43' is provided with the same reference sign the limit stops 43, 43'. The limit stops (43, 43') can be realized in the same manner as the aforementioned stopping means.

The target position of the tailgate 8 can also be given thereby by a longitudinal region, in which the tailgate 8 must be situated to reach a target position or for proper arrangement.

Consequently, two guide pins 38, 38' are arranged spaced apart from each other on one of the lateral flanks 42, 42' of the tailgate 8, which cooperate with the first guide means 16 for the translatory motion control for attaching the tailgate 8 on the rear of the vehicle 14.

The selected design of the respective guide groove 42, 42' is selected in such a way that the tailgate 8 still has only a degree of freedom of movement for the relative movement thereof to the pivoting frame 28 so that only a linear movement in the direction of the longitudinal extension 66 of the pivoting arms 22, 22' is possible as soon as the guide pins 38, 38' project into the guide grooves 42, 42'.

Against this background, it is advantageously ensured that the tailgate 8 can be fastened on the rear of the vehicle 14 in the target position in a simple manner by merely one person FIG. 7 shows the vehicle 2 in a schematic representation with reduced detail, wherein the depiction is restricted to the pivoting frame 28 along with the thereon attached hinge components 44 (for a better overview, identified uniformly with reference sign 44) of hinges 46 (for a better overview, identified uniformly with reference sign 46).

FIG. 7 shows the arrangement of the pivoting arms 22, 22' that are arranged parallel to each other. To realize a pivoting possibility of the pivoting frame 28 on the vehicle 2, in the case of the depicted embodiment of a vehicle configured according to the invention 2, two hinges 46 are provided spaced apart from each other in the axial direction of the pivoting axis 32, and a hinge component 44 of each hinge is arranged on the brace 26 of the pivoting frame 28. The brace 26 is arranged on a side 48 of the pivoting frame 28 facing the loading surface 6 and therefore arranged near to the axis of the pivoting axis 12.

The pivoting arms 22, 22' of the pivoting frame 28 are connected to each other by means of the brace 26 of the pivoting frame 28, thereby forming the pivoting frame 28 in a U-shaped manner in terms of its longitudinal cross-section.

The brace 26 is thereby welded with the pivoting arms 22, 22' of the pivoting frame 28 so that the pivoting frame 28 that is used is designed as one piece.

The hinge components 44 of the respective hinge 46 arranged on the brace 26 of the pivoting frame 28 are used for said hinge components, in cooperation with a respective further hinge component (not shown) arranged on the rear of the vehicle 14, to facilitate a pivoting of the tailgate 8 on the rear of the vehicle 14 or the pivoting arms 22, 22' or the pivoting frame 28 around a pivoting axis 12.

The realization of a corresponding hinge 46 (identified uniformly in the figures with reference sign 46) is known to a person skilled in the art so that no further explanation is required at this point.

FIG. 8 shows the vehicle 2 in the same representational format as in FIG. 7. In contrast to the depiction in FIG. 7, the tailgate 8 is arranged on the pivoting frame 28, wherein the pivoting frame 28 or the tailgate 8 is in a target position.

FIG. 8 shows that the pivoting frame 28 is designed in such a way and arranged on the rear of the vehicle 14 so that at least the pivoting arms 22, 22' of the pivoting frame 28 for motion control of the tailgate 8 for attachment thereof on the rear of the vehicle 14 or the pivoting arms 22, 22' or the pivoting frame 28 are covered by the outer surface 58 of the tailgate 8.

The outer surface 58 of the tailgate 8 is arranged facing away from the pivoting frame 28 in the case of the attachment thereof on the vehicle 2, as can likewise be seen in FIG. 9.

In FIG. 9, the vehicle rear 14 of the vehicle 2 is depicted in a view that is identified by C in FIG. 1.

Said depiction shows in turn that the outer surface 58 of the tailgate 8, in the closed position thereof, is facing away from the loading surface 6 of the vehicle 2 or the front of the vehicle 15.

The outer surface 58 of the tailgate 8 covers the pivoting frame 28 completely so that, in the closed position thereof, the tailgate 14 is not visible from the outside (outside the vehicle 2).

In addition, FIG. 9 shows that the pivoting frame 28 is arranged in a gap (free construction space) 52 between the tailgate 8 and the lateral parts of the rear of the vehicle 54, 56.

Along with visual advantages, it is thereby possible, among other things, that the pivoting apparatus 10 can be retrofitted on an already existing vehicle 2 so that an already existing vehicle can be retrofitted to form a vehicle according to the invention 2 having the corresponding components.

The gap 52 in this embodiment of a vehicle configured according to the invention 2 is covered by the outer surface 58 of the rear of the tailgate 8, which is facing away from the front of vehicle 15 or the loading surface 6 and directed outside the vehicle 2.

To attach the tailgate 8 on the pivoting arm/pivoting arms 22, 22' or the pivoting frame 8, it is possible to use already existing holes, threaded holes, bolts, grooves, beads and the like as well as corresponding function carriers of the tailgate 8.

Moreover, it is possible in terms of the invention to supplement the tailgate 8 with the afore-mentioned features, wherein the basic design and form thereof remains unaffected.

In the case of the embodiment of a vehicle configured according to the invention 2 depicted in the figures, the pivoting frame 28 is a retrofitted pivoting frame 28, wherein in an advantageous manner, the geometry of the existing vehicle 2 or the tailgate 8 used did not have be redesigned to use the pivoting frame 28.

In the case of the aforementioned examples, the first guide means forms in cooperation with the second guide means a plain bearing guide for the translatory motion control.

A further embodiment of a vehicle according to the invention is shown in FIGS. 10 to 12, in which, in contrast to the aforementioned embodiments, the first guide means forms in cooperation with the second guide means a roller guide 64 for the translatory motion control, whereas a plain bearing guide was used in the case of the previously cited examples. The roller guide in this case is designed thereby in accordance with a type of telescopic guide rail.

To form the roller guide 64, the guide pins 38, 38' of the plain bearing guide have been replaced by guide rollers 38, 38', which because of their equivalence to the guide pins 38, 38' have been provided with the same reference sign 38, 38'.

In FIGS. 10 to 12, the depiction of the embodiment of a vehicle according to the invention 2 follows the representational mode in FIGS. 4 to 6 in a schematic representation with reduced detail for the purpose of providing a better overview, in which the depiction is concentrated on the rear section, in which the pivoting apparatus 10 is illustrated in sections based on the pivoting arms 22, 22' of the pivoting frame 28. Due to the selected view, one pivoting arm 22 of the pivoting arms 22, 22' is shown representatively for the other pivoting arm 22'.

The tailgate 8 is depicted in FIG. 10 in an approach position, in which the tailgate 8 is guided to the pivoting frame 28 for the translatory motion control thereof.

To simplify the attachment on the rear of the vehicle 14, the tailgate 8 supports itself thereby on the pivoting frame 28 first by means of a roller 38', which, as was previously described based on the guide rollers 38, 38', is arranged laterally on the tailgate 8.

In FIG. 11, the vehicle 2 from FIG. 10 is depicted in the same representational format as in FIG. 11. In the depiction in FIG. 11, the tailgate 8 is situated in an initial position, in which it rests on or is supported on the pivoting frame 28 by means of the second guide means 18 or guide rollers 38, 38'.

FIG. 12 shows the vehicle 2 in the same representational format as in FIGS. 10 and 11.

In contrast to the depictions in FIGS. 10 and 11, the tailgate 8 is situated in a target position, in which the tailgate 8 has reached the desired arrangement on the rear of the vehicle 14 so that the tailgate 8 can be fastened on the pivoting frame 28.

Specifying a target position for the tailgate 8 takes place in turn by means of the already described limit stops 43, 43'. The further structure follows the previously described embodiments of a vehicle 2.

FIG. 13 shows a third embodiment of a vehicle according to the invention 2 in a section that was selected analogous to the depiction in FIG. 2. The depicted section concentrates on the vehicle rear 14 of the vehicle 2 and the tailgate 8 in an open position. In contrast to the previously described and depicted potential solution of a pivot limitation 30, it is provided that the pivot limitation 30 for determining the open position of the tailgate 8 is provided near to the axis of the pivoting axis 12. In the case of the depicted solution variant, a limitation element 66 is provided on the pivoting axis 12, which, in cooperation with the rear of the vehicle 14, limits the pivotability for predetermining an open position.

FIG. 14 shows in turn the vehicle 2 depicted in FIG. 13, in which the tailgate 8 has reached an open position.

Based on the depicted possible solutions for realizing a pivot limitation for the tailgate, other possibilities exist that show the same effect. Therefore, the pivot limitation can also be created by a pivot guide groove, in which a limitation element engages at least in sections so that an open position for the tailgate is predetermined in cooperation with the pivot guide groove.

The aforementioned figures show that there are diverse possibilities for realizing a vehicle configured according to the invention. The aforementioned embodiments merely identify the first possibilities of design.

In terms of the invention, it is likewise provided that guide means or fastening means is provided to fasten the tailgate on pivoting frame, which guide means or fastening means makes it possible to attach or detach the tailgate from the rear of the vehicle or from the pivoting frame without tools. This produces a further simplification in the handling of the tailgate in the case of a vehicle configured according to the invention. For example, a guide pin can be configured as a spring-loaded guide pin, which is arranged moveably on the tailgate in the axial direction and can engage in a recess on one of the pivoting arms in order to make it possible to fix the tailgate on the pivoting apparatus.

In addition, the invention makes it possible for the one tailgate to be replaced by a different one or by other differently designed tailgate(s), which have different function carriers as compared with the first-mentioned tailgate for example or which can be designed in a different manner in order to redesign a vehicle configured according to the invention in diverse and simple ways and be able to increase the usefulness of a vehicle according to the invention.

As already mentioned at the outset, the invention makes it possible to use different types of tailgates and to replace them simply and quickly. The tailgate can also be replaced thereby by a net or retaining straps, which can be arranged in particular on a pivoting arm on the pivoting arms or on the pivoting frame, preferably detachably.

The invention also includes that the loading surface can be provided for diverse purposes. To this end, it is also possible for example to provide the loading surface for the conveyance of persons and arrange seating areas on the loading surface for example. In addition, the invention also includes that the loading surface is covered by a vehicle roof at least in sections.

FIG. 15 shows the first embodiment of a vehicle according to the invention from FIG. 1 in a view identified by A in FIG. 1, wherein the tailgate 8 is in a closed position. As a result, the existing gap 52, in which the pivoting frame 28 is arranged, is thereby illustrated. The depiction has extensively reduced details for a better overview and therefore does not show all components.

The invention claimed is:

1. Vehicle, the vehicle having a front and a rear, comprising:
   a) a tailgate;
   b) the tailgate is arranged on the rear of the vehicle so that it can be pivoted by a pivoting apparatus around a pivoting axis between a closed position in which a loading surface of the vehicle is defined on the rear side, and an open position, in which the loading surface is open on the rear side;
   c) the pivoting apparatus has a first guide means, which is arranged on the rear of the vehicle and has a second guide means, which is arranged in turn on the tailgate, for translatory motion control of the tailgate for attachment thereof on the rear of the vehicle which cooperates in such a manner, that the tailgate is guided in a movable manner between an initial position, in which the first guide means and the second guide means are brought together for translatory motion control of the tailgate, and a target position, in which the tailgate is arranged in a purposeful manner on the rear of the vehicle;
   d) the second guide means is arranged on lateral flanks of the tailgate;
   e) the first guide means has at least two pivoting arms arranged on the rear of the vehicle at a distance from each other in the axial direction of the pivoting axis and can be pivoted around the pivoting axis, the pivoting arms extending longitudinally radial to the pivoting axis and each forming a guide part, which cooperates with the second guide means for the translatory motion control of the tailgate; and
   f) the first guide means is set up and configured with the second guide means for cooperating according to a guide part for the translatory motion control.

2. Vehicle, the vehicle having a front and a rear, comprising:
   a) a tailgate;
   b) the tailgate is arranged on the rear of the vehicle so that it can be pivoted by a pivoting apparatus around a pivoting axis between a closed position in which a loading surface of the vehicle is defined on the rear side, and an open position, in which the loading surface is open on the rear side;
   c) the pivoting apparatus has a first guide means, which is arranged on the rear of the vehicle and has a second guide means, which is arranged in turn on the tailgate, for translatory motion control of the tailgate for attachment thereof on the rear of the vehicle which cooperates in such a manner, that the tailgate is guided in a movable manner between an initial position, in which the first guide means and the second guide means are brought together for translatory motion control of the tailgate, and a target position, in which the tailgate is arranged in a purposeful manner on the rear of the vehicle;
   d) the second guide means is arranged on lateral flanks of the tailgate;
   e) the first guide means has at least two pivoting arms arranged on the rear of the vehicle at a distance from each other in the axial direction of the pivoting axis and can be pivoted around the pivoting axis, the pivoting arms extending longitudinally radial to the pivoting axis and each forming a guide part, which cooperates with the second guide means for the translatory motion control of the tailgate; and
   f) the first guide means is set up and configured in cooperation with the second guide means to form a telescopic guide rail.

3. Vehicle according to claim 2, wherein:
   a) the at least two pivoting arms are coupled for movement with each other by coupling means in such a way that the respective pivoting motion thereof around the pivoting axis is coordinated.

4. Vehicle according to claim 3, wherein:
   a) the coupling means has at least one brace, which connects the at least two pivoting arms to each other, and the at least one brace is connected to the at least two pivoting arms integrally.

5. Vehicle according to claim 4, wherein:
   a) the at least one brace is arranged near the axis of the pivoting axis.

6. Vehicle according to claim 4, wherein:
   a) the at least two pivoting arms with the at least one brace form a pivoting frame.

7. Vehicle according to claim 6, wherein:
   a) the pivoting frame is a one piece pivoting frame.

8. Vehicle, the vehicle having a front and a rear, comprising:
   a) a tailgate;
   b) the tailgate is arranged on the rear of the vehicle so that it can be pivoted by a pivoting apparatus around a pivoting axis between a closed position in which a loading surface of the vehicle is defined on the rear side, and an open position, in which the loading surface is open on the rear side;
   c) the pivoting apparatus has a first guide means, which is arranged on the rear of the vehicle and has a second guide means, which is arranged in turn on the tailgate, for translatory motion control of the tailgate for attachment thereof on the rear of the vehicle which cooperates in such a manner, that the tailgate is guided in a movable manner between an initial position, in which the first guide means and the second guide means are brought together for translatory motion control of the tailgate, and a target position, in which the tailgate is arranged in a purposeful manner on the rear of the vehicle;
   d) the second guide means is arranged on lateral flanks of the tailgate;
   e) the first guide means has at least two pivoting arms arranged on the rear of the vehicle at a distance from each other in the axial direction of the pivoting axis and can be pivoted around the pivoting axis, the pivoting arms extending longitudinally radial to the pivoting axis and each forming a guide part, which cooperates with the second guide means for the translatory motion control of the tailgate; and
   f) means for pivot limitation limits pivotability of at least one of the at least two pivoting arms around the pivoting axis.

9. Vehicle, the vehicle having a front and a rear, comprising:
 a) a tailgate;
 b) the tailgate is arranged on the rear of the vehicle so that it can be pivoted by a pivoting apparatus around a pivoting axis between a closed position in which a loading surface of the vehicle is defined on the rear side, and an open position, in which the loading surface is open on the rear side;
 c) the pivoting apparatus has a first guide means, which is arranged on the rear of the vehicle and has a second guide means, which is arranged in turn on the tailgate, for translatory motion control of the tailgate for attachment thereof on the rear of the vehicle which cooperates in such a manner, that the tailgate is guided in a movable manner between an initial position, in which the first guide means and the second guide means are brought together for translatory motion control of the tailgate, and a target position, in which the tailgate is arranged in a purposeful manner on the rear of the vehicle;
 d) the second guide means is arranged on lateral flanks of the tailgate;
 e) the first guide means has at least two pivoting arms arranged on the rear of the vehicle at a distance from each other in the axial direction of the pivoting axis and can be pivoted around the pivoting axis, the pivoting arms extending longitudinally radial to the pivoting axis and each forming a guide part, which cooperates with the second guide means for the translatory motion control of the tailgate; and
 f) the at least one pivoting arm is arranged at least in sections in a gap between the tailgate and the lateral flanks of the rear of the vehicle.

10. Vehicle, the vehicle having a front and a rear, comprising:
 a) a tailgate;
 b) the tailgate is arranged on the rear of the vehicle so that it can be pivoted by a pivoting apparatus around a pivoting axis between a closed position in which a loading surface of the vehicle is defined on the rear side, and an open position, in which the loading surface is open on the rear side;
 c) the pivoting apparatus has a first guide means, which is arranged on the rear of the vehicle and has a second guide means, which is arranged in turn on the tailgate, for translatory motion control of the tailgate for attachment thereof on the rear of the vehicle which cooperates in such a manner, that the tailgate is guided in a movable manner between an initial position, in which the first guide means and the second guide means are brought together for translatory motion control of the tailgate, and a target position, in which the tailgate is arranged in a purposeful manner on the rear of the vehicle;
 d) the second guide means is arranged on lateral flanks of the tailgate;
 e) the first guide means has at least two pivoting arms arranged on the rear of the vehicle at a distance from each other in the axial direction of the pivoting axis and can be pivoted around the pivoting axis, the pivoting arms extending longitudinally radial to the pivoting axis and each forming a guide part, which cooperates with the second guide means for the translatory motion control of the tailgate; and
 f) the at least two pivoting arms on the rear of the vehicle are covered by an outer surface of the tailgate at least in sections.

11. Vehicle, the vehicle having a front and a rear, comprising:
 a) a tailgate;
 b) the tailgate is arranged on the rear of the vehicle so that it can be pivoted by a pivoting apparatus around a pivoting axis between a closed position in which a loading surface of the vehicle is defined on the rear side, and an open position, in which the loading surface is open on the rear side;
 c) the pivoting apparatus has a first guide means, which is arranged on the rear of the vehicle and has a second guide means, which is arranged in turn on the tailgate, for translatory motion control of the tailgate for attachment thereof on the rear of the vehicle which cooperates in such a manner, that the tailgate is guided in a movable manner between an initial position, in which the first guide means and the second guide means are brought together for translatory motion control of the tailgate, and a target position, in which the tailgate is arranged in a purposeful manner on the rear of the vehicle;
 d) the second guide means is arranged on lateral flanks of the tailgate;
 e) the first guide means has at least two pivoting arms arranged on the rear of the vehicle at a distance from each other in the axial direction of the pivoting axis and can be pivoted around the pivoting axis, the pivoting arms extending longitudinally radial to the pivoting axis and each forming a guide part, which cooperates with the second guide means for the translatory motion control of the tailgate; and
 f) the second guide means has at least one guide pin, which cooperates with the first guide means for the translatory motion control for attaching the tailgate on the rear of the vehicle, and the at least one guide pin is arranged on at least one of the lateral flanks of the tailgate.

12. Vehicle, the vehicle having a front and a rear, comprising:
 a) a tailgate;
 b) the tailgate is arranged on the rear of the vehicle so that it can be pivoted by a pivoting apparatus around a pivoting axis between a closed position in which a loading surface of the vehicle is defined on the rear side, and an open position, in which the loading surface is open on the rear side;
 c) the pivoting apparatus has a first guide means, which is arranged on the rear of the vehicle and has a second guide means, which is arranged in turn on the tailgate, for translatory motion control of the tailgate for attachment thereof on the rear of the vehicle which cooperates in such a manner, that the tailgate is guided in a movable manner between an initial position, in which the first guide means and the second guide means are brought together for translatory motion control of the tailgate, and a target position, in which the tailgate is arranged in a purposeful manner on the rear of the vehicle;
 d) the second guide means has at least one guide pin, and is arranged on lateral flanks of the tailgate;
 e) the first guide means has at least two pivoting arms arranged on the rear of the vehicle at a distance from each other in the axial direction of the pivoting axis and can be pivoted around the pivoting axis, the pivoting arms extending longitudinally radial to the pivoting axis and each forming a guide part, which cooperates with the second guide means for the translatory motion control of the tailgate; and f) the at least two pivoting arms form a pivoting frame, and the tailgate can be fastened on the pivoting frame by the at least one guide pin.

13. Vehicle, the vehicle having a front and a rear, comprising:

a) a tailgate;

b) the tailgate is arranged on the rear of the vehicle so that it can be pivoted by a pivoting apparatus around a pivoting axis between a closed position in which a loading surface of the vehicle is defined on the rear side, and an open position, in which the loading surface is open on the rear side;

c) the pivoting apparatus has a first guide means, which is arranged on the rear of the vehicle and has a second guide means, which is arranged in turn on the tailgate, for translatory motion control of the tailgate for attachment thereof on the rear of the vehicle which cooperates in such a manner, that the tailgate is guided in a movable manner between an initial position, in which the first guide means and the second guide means are brought together for translatory motion control of the tailgate, and a target position, in which the tailgate is arranged in a purposeful manner on the rear of the vehicle;

d) the second guide means is arranged on lateral flanks of the tailgate;

e) the first guide means has at least two pivoting arms arranged on the rear of the vehicle at a distance from each other in the axial direction of the pivoting axis and can be pivoted around the pivoting axis, the pivoting arms extending longitudinally radial to the pivoting axis and each forming a guide part, which cooperates with the second guide means for the translatory motion control of the tailgate; and f) at least one of the at least two pivoting arms has at least one guide groove, which cooperates with the second guide means of the tailgate in such a way that the translatory motion control of the tailgate is directed radially to the pivoting axis.

14. Vehicle, the vehicle having a front and a rear, comprising:

a) a tailgate;

b) the tailgate is arranged on the rear of the vehicle so that it can be pivoted by a pivoting apparatus around a pivoting axis between a closed position in which a loading surface of the vehicle is defined on the rear side, and an open position, in which the loading surface is open on the rear side;

c) the pivoting apparatus has a first guide means, which is arranged on the rear of the vehicle and has a second guide means, which is arranged in turn on the tailgate, for translatory motion control of the tailgate for attachment thereof on the rear of the vehicle which cooperates in such a manner, that the tailgate is guided in a movable manner between an initial position, in which the first guide means and the second guide means are brought together for translatory motion control of the tailgate, and a target position, in which the tailgate is arranged in a purposeful manner on the rear of the vehicle;

d) the second guide means is arranged on lateral flanks of the tailgate;

e) the first guide means has at least two pivoting arms arranged on the rear of the vehicle at a distance from each other in the axial direction of the pivoting axis and can be pivoted around the pivoting axis, the pivoting arms extending longitudinally radial to the pivoting axis and each forming a guide part, which cooperates with the second guide means for the translatory motion control of the tailgate;

f) at least one of the at least two pivoting arms has at least one guide groove, which cooperates with the second guide means of the tailgate in such a way that the translatory motion control of the tailgate is directed radially to the pivoting axis; and g) the pivoting apparatus includes a positioning aid for attaching the tailgate on the rear of the vehicle, and through which the target position is specified for the tailgate.

15. Vehicle according to claim 1, wherein:

a) the first guide means and the second guide means for the translatory motion control are configured in a manner complementary to each other at least in sections.

16. Vehicle according to claim 1, wherein:

a) the first guide means in cooperation with the second guide means forms at least in sections a linear guide for the attachment of the tailgate on the rear of the vehicle.

* * * * *